United States Patent [19]
Bader et al.

[11] Patent Number: 6,100,791
[45] Date of Patent: Aug. 8, 2000

[54] PROGRAMMABLE EMERGENCY SIGNALLING DEVICE AND SYSTEM

[75] Inventors: Joseph F. Bader, Crete; Ward Gieffers, Oak Lawn; Michael Benner, Lisle, all of Ill.; Kent Allen Kekeis, Munster, Ind.; Dennis James Hilburger, Dolton, Ill.

[73] Assignee: Federal Signal Corporation, University Park, Ill.

[21] Appl. No.: 08/319,123

[22] Filed: Oct. 6, 1994

Related U.S. Application Data

[63] Continuation of application No. 08/102,690, Aug. 5, 1993, Pat. No. 5,422,623, which is a continuation of application No. 08/055,926, Apr. 30, 1993, abandoned, and a continuation of application No. 07/592,557, Oct. 4, 1990, abandoned.

[51] Int. Cl.[7] .................................................. G08B 1/00
[52] U.S. Cl. ..................... 340/331; 340/471; 340/472; 340/531; 340/332; 340/490; 340/815.19; 340/458; 362/35; 362/80
[58] Field of Search ........................... 340/471, 472, 340/531, 332, 490, 815.19, 331, 458; 362/35, 80

[56] References Cited

U.S. PATENT DOCUMENTS

| | | |
|---|---|---|
| 2,097,537 | 11/1937 | Snyder . |
| 2,362,110 | 11/1944 | Meyerhoeffer . |
| 2,421,593 | 6/1947 | Bishop . |
| 2,478,242 | 8/1949 | Clapp . |
| 2,502,975 | 4/1950 | McFarlane . |
| 2,537,822 | 1/1951 | Fritts . |
| 2,605,453 | 7/1952 | Miller . |
| 2,644,152 | 6/1953 | Ginsberg . |
| 2,680,223 | 6/1954 | Hammett . |
| 2,726,389 | 12/1955 | Taylor . |
| 2,754,513 | 7/1956 | Goubau . |
| 2,846,663 | 8/1958 | Heehler et al. . |
| 2,859,396 | 11/1958 | King . |

(List continued on next page.)

FOREIGN PATENT DOCUMENTS

| | | |
|---|---|---|
| 57-49841 | 10/1980 | Japan . |
| 60-143502 | 3/1982 | Japan . |
| 60-15205 | 6/1984 | Japan . |
| 2-183902 | 1/1989 | Japan . |
| 4-34609 | 3/1992 | Japan . |
| 1595582 | 8/1981 | United Kingdom . |
| 2222919 | 3/1990 | United Kingdom . |

OTHER PUBLICATIONS

Brochure for "Robolite" manufactured by Raztech, Crete, Illinois.
Brochure for Sonascanner™, manufactured by Meteor Corporation of Madison, Alabama, undated.

(List continued on next page.)

*Primary Examiner*—Jeffery Hofsass
*Assistant Examiner*—Nina Tong
*Attorney, Agent, or Firm*—Leydig, Voit & Mayer, Ltd.

[57] ABSTRACT

An emergency signalling system is disclosed that incorporates an emergency signalling device including a light source and reflector mounted for relative rotation in incremental steps in either clockwise or counterclockwise directions. A programmable control unit of the signalling system provides digital signals to a drive source for controlling the speed and direction of the relative rotation. In response to the digital signals, the signalling device executes a variety of different visual patterns. The signalling system can be programmed from a keyboard preferably integrated into a control head mounted to a dashboard area of a vehicle incorporating the emergency signalling system. Virtually any type of visual warning pattern based on the relative rotation of a light source and reflector can be executed by the signalling device if properly programmed.

12 Claims, 14 Drawing Sheets

U.S. PATENT DOCUMENTS

| | | |
|---|---|---|
| 2,973,481 | 2/1961 | Frye . |
| 2,973,518 | 2/1961 | Jensen . |
| 3,166,699 | 1/1965 | Dalzell . |
| 3,259,738 | 7/1966 | Strother, Jr. . |
| 3,487,277 | 12/1969 | Walters . |
| 3,588,656 | 6/1971 | Shofner . |
| 3,639,821 | 2/1972 | Byers et al. . |
| 3,644,728 | 2/1972 | Hessemer et al. . |
| 3,683,379 | 8/1972 | Saddler et al. . |
| 3,790,938 | 2/1974 | Anderson et al. . |
| 3,802,780 | 4/1974 | Helm et al. . |
| 3,852,651 | 12/1974 | Dufendach . |
| 4,054,791 | 10/1977 | Du Shane . |
| 4,058,794 | 11/1977 | Menke . |
| 4,096,470 | 6/1978 | Kemmelman . |
| 4,126,818 | 11/1978 | Taylor . |
| 4,210,357 | 7/1980 | Adachi . |
| 4,319,306 | 3/1982 | Stanuch . |
| 4,353,110 | 10/1982 | Ellis . |
| 4,357,595 | 11/1982 | Gosswiller . |
| 4,377,802 | 3/1983 | Ferenc . |
| 4,392,187 | 7/1983 | Bornhorst . |
| 4,413,451 | 11/1983 | Featherstone et al. . |
| 4,439,715 | 3/1984 | Taylor . |
| 4,529,981 | 7/1985 | Ratcliffe . |
| 4,611,263 | 9/1986 | Kawai . |
| 4,635,062 | 1/1987 | Bierig et al. . |
| 4,637,487 | 1/1987 | Nakamura et al. . |
| 4,689,541 | 8/1987 | Jones et al. . |
| 4,701,743 | 10/1987 | Pearlman et al. . |
| 4,710,691 | 12/1987 | Bergstrom et al. . |
| 4,757,247 | 7/1988 | Ranger . |
| 4,831,357 | 5/1989 | Miller . |
| 4,851,869 | 7/1989 | Ishimaru et al. . |
| 4,924,840 | 5/1990 | Wade . |
| 4,931,768 | 6/1990 | Jincks et al. . |
| 4,943,019 | 7/1990 | Mester . |
| 5,097,397 | 3/1992 | Stanuch et al. ............................ 362/74 |
| 5,181,429 | 1/1993 | Sieber . |
| 5,296,840 | 3/1994 | Gieffers ................................... 340/474 |
| 5,557,257 | 9/1996 | Gieffers ................................... 340/474 |

OTHER PUBLICATIONS

Brochure for SelectAlert™, manufactured by Public Safety Equipment, dated 1977.

VariLite Console Operation Manual, 1982.

Navy Training Courses, "Basic Electronis", *NAVPERS 10087*, United States Government Printing Office, Washington D.C. 1955, pp. 672–673 and 682.

Navy Training Courses, "Electronics Technician 1 & C," *NAVPERS 10192*, United States Government Printing Office, Washington D.C. 1958, pp. 358–365.

Navy Training Courses, "Electronics Technician 3 & 2" *NAVPERS 10317–A*, United States Government Printing Office, Washington D.C. 1959, pp. 339–370.

Jay, Frank and Goetz, J.S., *IEEE Standard Dictionary of Electrical and Electronic Terms*, The Institutute of Electrical and Electronics Engineers, Inc., New York, N.Y., 1988, p.81.

H.T. Friis and W.D. Lewis, Radar Antennas, The Bell System Technical Journal, vol. XXVI, No. 2 (Apr. 1947) pp. 219–317.

D.G. Fink and D. Christiansen, "Radar, Navigation, and Underwater Sound Systems" (Section 25) Electronics Engineers Handbook, 2nd Edition, McGraw–Hill Book Company, New York, NY, 1982, pp. 25–1 to 25–5.

Selenia, Industrie Elettroniche Associate S.p.A., "SHF Antenna", *Rivista Tecnica Selenia*, vol. 4, No. 4, 1977, pp. 47–74.

|  | PRIMARY | AUXILIARY |
|---|---|---|
| SET #1 | WORD | # 1 |
|  | ○○○ | ○○○ |
|  | WORD | #12 |
| SET #2 | WORD | # 1 |
|  | ○○○○ | ○○○○ |
|  | WORD | #12 |
| SET #7 | WORD | # 1 |
|  | ○○○ | ○○○ |
|  | WORD | #12 |

FIG 2a

PROGRAMMABLE EMERGENCY SIGNALLING DEVICE AND SYSTEM

This is a continuation of application(s) Ser. No. 08/102,690, filed on Aug. 5, 1993, now U.S. Pat. No. 5,422,623, issued on Jun. 6, 1995, of Bader et al., for PROGRAMMABLE EMERGENCY SIGNALLING DEVICE AND SYSTEM, which in turn is a continuation of U.S. patent application Ser. No. 08/055,926, filed Apr. 30, 1993 (now abandoned) and Ser. No. 07/592,557, filed Oct. 4, 1990 (now abandoned).

TECHNICAL FIELD OF THE INVENTION

The invention relates to emergency signalling systems of the type used in conjunction with emergency vehicles such as police cars, fire engines, ambulances and the like to alert others to the approach of such vehicles.

BACKGROUND

Typically, emergency signalling systems include a plurality of signalling devices. For example, a system may include a siren/speaker and visual indicators such as rotating and flashing lights and auxiliary lights such as take-down lights, alley lights and headlight flashers. Different combinations of these devices are simultaneously operated in order to create signalling patterns of different types. Each type is usually designed for use in a particular category of emergency situations. For example, when a vehicle incorporating such a system is stopped on the side of the road in order to help a disabled vehicle, operation of only the flashing lights may be appropriate. When pursuing a vehicle, maximum signalling is required and the primary visual indicators (rotators) and a siren may be added to the flashing lights. A non-pursuit-type emergency may call for the primary visual indicators and the flashing lights, but no siren.

So the operator of the emergency vehicle does not have to configure his/her own emergency signalling each time the system is used, each system is typically designed to operate in one of a plurality of selectable "operating modes." Using the example of the previous paragraph, a first operating mode may operate the system with flashing lights only. A second operating mode may operate the flashing lights and the rotating lights. A third operating mode may operate all of the flashing lights, rotating lights and the siren/speaker.

Designating the functions of each operating mode, however, restricts the versatility of the system and prevents an operator from tailoring the various operating modes to the needs of his/her particular application and environment. In order to provide some versatility to the system, it is known to provide dip switches on the circuit boards of the system that allow selected signalling devices to be enabled for each operating mode. Unfortunately, the dip switches are not easily accessible and require a service technician to partially disable an installed system if the operating modes are to be changed. Moreover, they are expensive and require considerable space. In order to provide any significant amount of system versatility, a large number of the switches would be required, thereby making such a system bulky and expensive.

In addition to the selective enablement of various signalling devices for different operating modes, attempts have been made to provide the signalling devices themselves with more than one operating mode. For example, U.S. Pat. No. 4,701,743 to Pearlman et al. discloses a signalling device comprising a light source and a reflector mounted for relative rotation in two different operating modes. A first mode provides for relative rotation between two end points so that the reflector in effect oscillates through an arc. In a second mode of operation, the reflector continuously rotates the reflector in a single direction.

In order to provide for the oscillating rotation of the reflector, sensors are mounted at the end points of the oscillation so that a control circuit is informed when the reflector has completed its rotation through the arc. When the control circuit receives an indication that the reflector has reached an end point, it reverses the rotation of a motor driving the relative rotation, thereby reversing the direction of the rotation and rotating the reflector to the opposite end point where the control circuit again reverses the motor's rotation.

Although such a signalling device provides two modes of operation that can be selected by a user, the oscillatory mode is restricted by the placement of the sensors for detecting the end points of the oscillation. In order to modify the oscillatory mode, hardware modifications must be made to the signalling device. Moreover, if additional modes of operation are to be added to such a signalling device, additional expensive sensors must be provided. As additional modes of operation are added, the device very quickly becomes complex and expensive, thereby effectively making the device commercially unfeasible. Furthermore, although such multi-mode signalling devices may add additional available patterns to a signalling system incorporating these devices, they provide only a small additional degree of flexibility to the system while introducing substantial complexity and expense.

SUMMARY OF THE INVENTION

It is a primary object of the invention to provide an emergency signalling device comprising a light source and reflector mounted for relative rotation and capable of executing virtually any rotational or stationary visual pattern without requiring a modification of the hardware comprising the device. In this connection, it is a related object of the invention to provide the foregoing emergency signalling device with the ability to alternatively function as an emergency warning light or as a spotlight for illuminating a target area, without requiring a modification of the hardware comprising the device.

It is another object of the invention to provide an emergency signalling device that meets the foregoing objects while maintaining a simple and inexpensive construction.

It is another important object of the invention to incorporate into a signalling system an emergency signalling device having the foregoing features such that the system can be tailored after its assembly to execute any of a group of alternative visual patterns where the composition of the group is selected by a user of the system. It is a more specific object of the invention to provide the foregoing signalling system where the selection of the composition of the group of visual patterns may be made after the system is installed in an emergency vehicle.

It is another object of the invention to provide the foregoing signalling system such that the visual patterns comprising the group available for execution by the system can be changed or modified at any time before or after the system is installed in an emergency vehicle.

It is still another object of the invention to provide the foregoing signalling system with the ability to quickly and easily modify the composition of the group of visual patterns, using a straightforward and easy-to-understand procedure while at the same time maintaining the simplest user display possible.

Other objects and advantages will become apparent upon reference to the following detailed description when taken in conjunction with the drawings.

To achieve the foregoing objects and others, there is provided an emergency signalling device for incorporation into an emergency signalling system that includes a light source and reflector mounted for relative rotation that is driven in incremental steps in either clockwise or counterclockwise directions. A control unit of the signalling system provides digital signals to a drive source for controlling the speed and direction of the relative rotation. In response to the digital signals, the signalling device executes a variety of different visual patterns.

As part of the control unit, a user interface is provided for selecting one of a group of the visual patterns to be executed by the signalling device. Installed in a vehicle, the user interface of the control unit is typically mounted to a dashboard area of a passenger compartment. In the preferred embodiment, the remainder of the control unit is distributed between a housing within the vehicle and a housing incorporated into the housing for the signalling device. The portion of the control unit contained in the housing within the vehicle controls the functioning of auxiliary devices of the emergency signalling system such as, for example, circuits for flashing the headlights of the vehicle, releasing the trunk lock and releasing a gun lock. In order to minimize the wiring to the roof of the vehicle, serial data lines are used to communicate between the portion of the control unit in the housing of the signalling device and the portion within the vehicle. If the control unit was fully contained within the interior of the vehicle, numerous wires would typically be required in the cabling connecting the signalling device to the control unit. Because the dimensioning of the cabling connecting to the signalling device on the roof of a vehicle is an important consideration for commercial acceptance, the preferred embodiment of the invention distributes the control unit in a manner to minimize the wiring in the cable.

The control unit alternately functions in programming and operating modes. In the operating mode, the control unit provides the digital signals to the drive source of the signalling device for executing the visual pattern selected at the user interface. In the programming mode, the composition of the group of visual patterns available in the operating mode may be changed.

In a preferred embodiment, the control unit is based on several microprocessors and a memory containing a plurality of possible visual patterns that can be executed by the signalling device. A control head, typically mounted in a passenger compartment of a vehicle fitted with the signalling system, is the user interface that initiates execution of a visual pattern by the signalling device. The visual pattern executed by the signalling device is selected by the user of the system from a group of patterns accessible through the control head. In order to modify the group of visual patterns available for execution by the signalling device, means are provided for placing the control unit in the programming mode, which allows the visual patterns comprising the group to be changed.

For ease of programming, a memory of the visual patterns is organized to include alternative groups of the visual patterns that are expected to be the most popular combinations of visual patterns. In the programming mode, one of the groups of visual patterns in memory may be selected to change the group available in the operating mode. If one or more of the visual patterns comprising the group are not the ones desired by the user, the composition of the selected group can be modified by replacing the undesired visual pattern with another of the visual patterns contained in memory.

The drive source for the signalling device preferably includes a stepper motor and an associated driver circuit responsive to the digital signals from the control unit. There are two digital signals. The first signal is a train of pulses whose characteristic frequency is proportional to the speed of the relative rotation of the reflector and light source. The second signal is a signal having a binary state where each state is indicative of a relative direction of rotation for the reflector and light source (i.e., clockwise or counterclockwise). The driver circuit is of conventional design and translates the speed and direction information of the digital signals into appropriate drive signals for directly driving the stepper motor in the appropriate direction and at the appropriate speed.

The signalling device itself includes a mounting device that suspends the light source over the assembly for rotating the reflector and along the axis of the rotation. The stepper motor directly drives the reflector assembly, while the mounting device for the light source presents a minimum profile to light emanated directly from the light or reflected off the reflector. A sensor mounted in the signalling device cooperates with an extension of the assembly for rotating the reflector in order to provide a positional signal that is fed back to the control unit.

Because the signalling device is capable of performing a variety of functions, it is important that the device be able to meet the appropriate photometric standards (e.g., Society of Automotive Engineers) for each function. In the past, each signalling device of a system typically performed a single function and its physical characteristics could be tailored for a particular set of photometric standards. In general, some functions are thought to best be realized by narrow beams, while others are more suitable for wider beams. For narrow beam functions, the photometric requirements typically call for high candle intensity on the axis of the paraboloid, while wide beam functions call for relatively high candle intensity off axis.

In order for the signalling device of the invention to meet the photometric requirements for all of its possible modes of operation, a finish is placed on the surface of the reflector so that it has a beam of relatively intermediate width and sufficient candle intensity on and off its main axis such that both narrow and broad beam intensity requirements are met. To ensure sufficient beam width, the reflector finish is prepared using a conventional chemical dipping and anodizing process, commonly called "bright dipping." In order to ensure the candle intensity is sufficient, a 50 watt halogen lamp is preferred.

BRIEF DESCRIPTION OF THE DRAWINGS

FIG. 1a is an enlarged perspective view of one of the signalling devices and its modular housing;

FIG. 2a is a schematic representation of a memory incorporated into the control unit and containing alternative sets of functions that may be executed by the system in response to entries made at the control head, where only one set at a time is accessible from the control head and each set defines a primary and/or auxiliary function for each key of a keypad integrated into the control head;

FIG. 3a is a schematic representation of a memory incorporated into the portion of the control unit housed in the light bar and containing a plurality of different visual patterns that may each be executed by one of the signalling devices in response to an identification of a primary function in the memory of FIG. 2a;

FIG. 7a is a side view of one of the signalling devices of the invention and its modular-housing taken along the line 7a—7a in FIG. 1a;

FIG. 7b is a plan view of the signalling device of the invention taken along the line 7b—7b of FIG. 7a;

FIG. 7c is a side view of the signalling device of the invention taken along the line 7c–7c of FIG. 7a;

While the invention will be described in connection with a preferred embodiment, there is no intent to limit it to those embodiments. On the contrary, the intent is to cover all alternatives, modifications and equivalents falling within the spirit and scope of the invention as defined by the appended claims.

DETAILED DESCRIPTION OF THE PREFERRED EMBODIMENT

Figure 1:
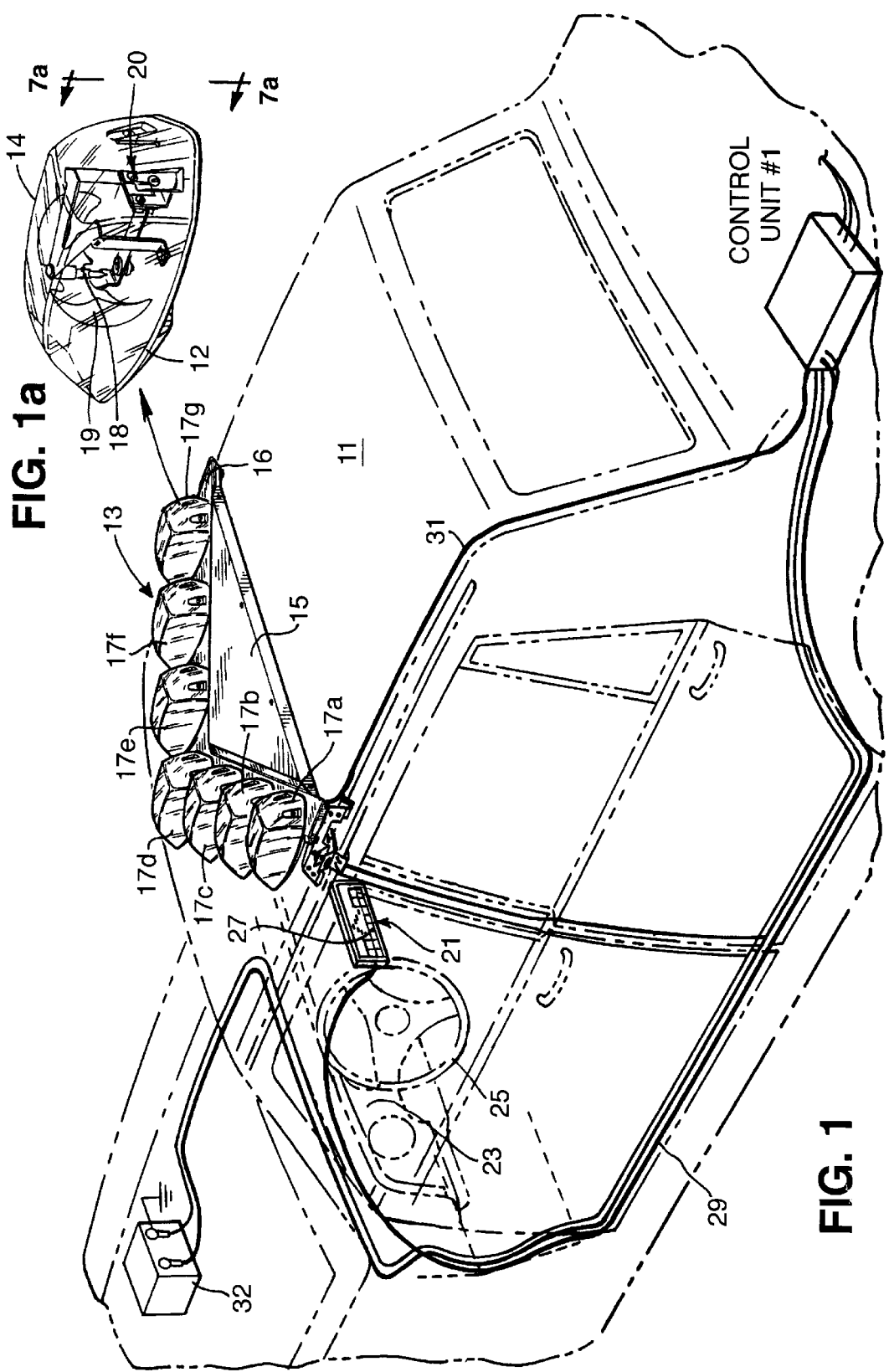
FIG. 1 is an elevated perspective view of an emergency vehicle incorporating a signalling system that includes a plurality of signalling devices according to the invention individually housed in modules of a light bar and responsive to a control unit and its control head.
Figure 2:
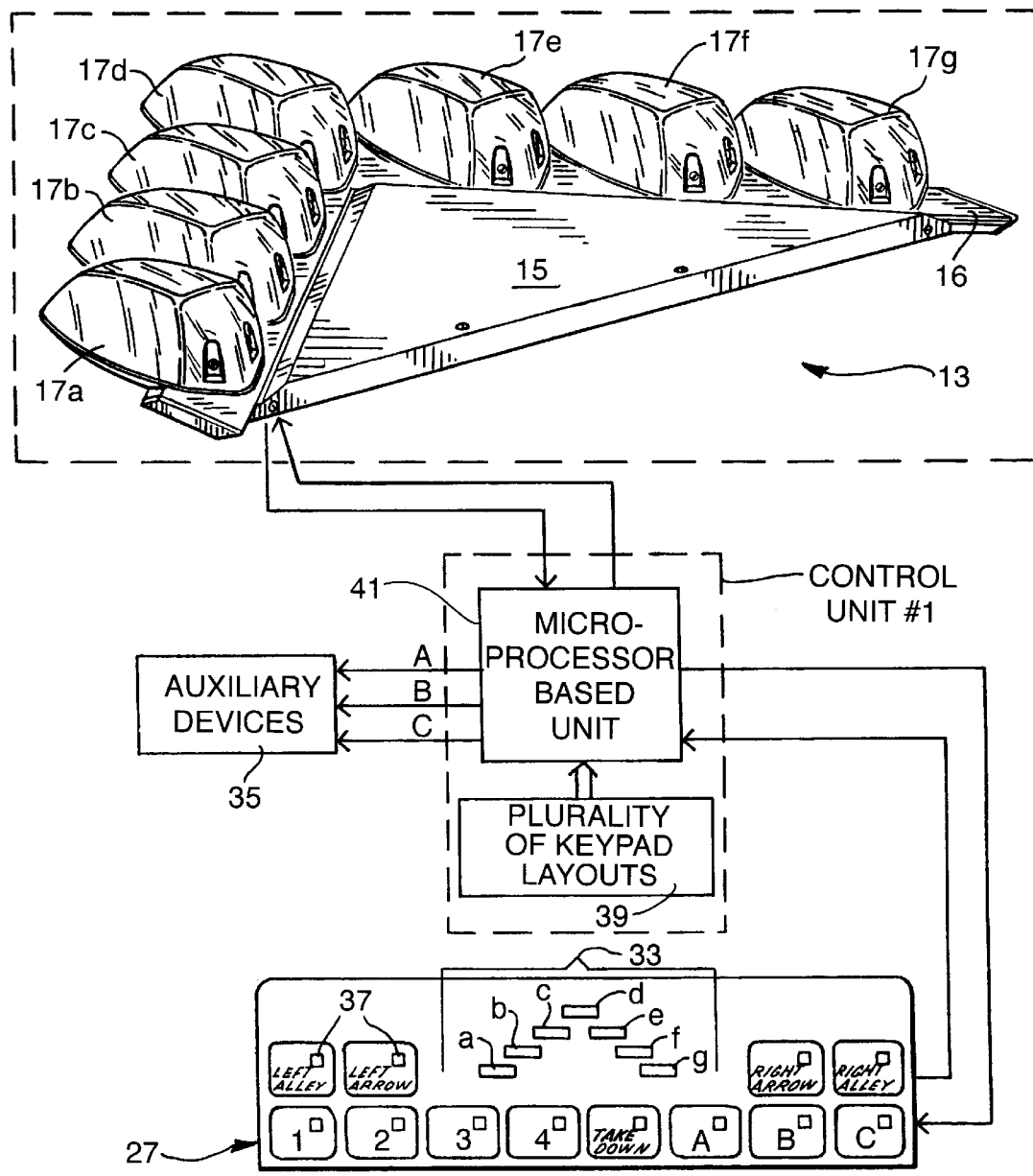
FIG. 2 is a schematic diagram of the signalling system of FIG. 1, more clearly illustrating the modules of the light bar and the architecture of the control unit of the signalling system in accordance with a preferred embodiment.

Turning to the drawings and referring first to FIGS. 1, 1a and 2, a signalling system according to a preferred embodiment of the invention is installed in an exemplary emergency vehicle 11 shown in broken lines. The system includes a light bar 13 comprising a plurality of like modules 17(a) –17(g) housing signalling devices constructed in accordance with the invention. In the exemplary bar 13, each of the signalling devices is contained within one of the modules. Each of the modules 17(a)–17(g) comprises a base section 12 and a dome 14 (as best seen in FIG. 1a) mounted to a frame 16 that traverses the vehicle 11. The frame 16 supports a housing 15 containing a portion of the electronics for controlling the signalling devices as will be explained more fully hereinafter. The light bar 13 is mounted to the vehicle 11 by way of a mounting assembly 18 at each end of the frame 16.

It will be appreciated by those familiar with emergency signalling systems for vehicles that the illustrated nonlinear arrangement of the seven (7) modules 17(a)–17(g) is only exemplary and many different configurations of the signalling devices and their housings may be incorporated into the signalling system of the invention as will become more apparent hereinafter. U.S. application Ser. No. assigned to the same assignee as that of present invention, discloses the illustrated nonlinear light bar 13 in detail. An example of an alternative configuration for the light bar 13 could be a conventional linear arrangement with a single dome protecting all of the signalling devices. Regardless of the type of light bar incorporating it, each of the signalling devices 20, as best seen in FIG. 1a, includes a lamp 18 and a reflector 19 mounted for relative rotation about a vertical axis in a manner discussed more fully hereinafter.

Because each of the signalling devices within the modules 17(a)–17(g) is identical to the other, the single reference number 20 will be used for each one of the devices, although separate devices are housed in each one of the modules 17(a)–17(g). In order to facilitate the description of the inventive system with reference to the drawings, the control units comprising the system are at times herein described as controlling the modules 17(a)–17(g). It will be appreciated, however, that it is actually the signalling devices 20 within the modules that are being controlled and not their modular housing.

In the light bar of the above-identified co-pending patent application and in the illustrated bar 13, space in the bar is reserved for a portion of the circuitry that controls each of the signalling devices 20. In the illustrated light bar 13, the housing 15 is intended to provide an RF shield for electronics inside the light bar since the vehicle 11 will most likely be exposed to considerable RF noise. For example, the vehicle 11 is typically equipped with a two-way radio (not shown) whose transmitter creates serious noise problems for the electronics in the light bar 13 and, therefore, requires the electronics to be adequately shielded. Of course, the housing 15 must also protect the electronics from the elements. Techniques for electrically and physically sealing the housing 15 are well known in the art.

In addition to a two-way radio, the vehicle 11 is most likely equipped with a siren that is used in conjunction with the signalling system of the system. The control system for the siren is independent of the control system of the signalling devices in the illustrated embodiment and hence not shown. Since the siren and signalling devices are typically operated in conjunction with one another, however, it may be desirable to marry the two control systems into a single architecture not shown here. In general, integrating light bar and siren functions into a single control system is well known and will not be discussed further herein.

Control of the group of modules 17(a)–17(g) comprising the light bar 13 is provided by a control head 21 and first and second control units. The control head 21 is mounted in the interior area of the vehicle 11 and preferably on the dashboard/instrument panel area 23 just to the right of the steering wheel 25 for easy access by the operator of the vehicle. Although the first control unit (hereinafter "control unit #1") is shown as being mounted in the trunk area of the vehicle 11, it may be mounted elsewhere within the vehicle, depending upon the precise design of the vehicle and the number of other accessories included in the vehicle. For example, control unit #1 may be mounted under the dashboard area 23. The second control unit (hereinafter "control unit #2") (not shown in FIGS. 1 and 2) is mounted within the housing 15 of the light bar 13.

Keystrokes to a keypad 27 incorporated into the control head 21 provide signals to control unit #1 by way of a cable 29, which in turn communicates signals to the control unit #2 within the light bar 13 by way of cable 31. The keypad 27 is preferably a membrane-type array of switches. From the control unit #2, the operation of the signalling devices is directly controlled in accordance with the signals received by that control unit. The cables 29 and 31 are typically strategically placed within the interior of the vehicle 11 so they are the least conspicuous and require the least modification of the standard interior features provided by the manufacturer of the vehicle. In this regard, the distribution of the electronics among the control head 21 and the control units #1 and #2 effectively minimizes the number of wires comprising the cables 29 and 31. Each of the two cables includes two data-carrying wires for bi-directional serial communications. Separate cabling from a battery 32 carries power and reference ground wires to the control units #1 and #2.

A typical layout of the functions for the various keys of the keypad 27 of the control head 21 is illustrated in FIG. 2. Centrally located in the upper portion of the control head 21 are seven (7) light emitting diodes LEDs 33(a)–33(g). Each of the LEDs 33(a)–33(g) is intended to correspond to one of the modules 17(a)–17(g) such that the non-linear spatial relationship of the seven modules 17(a)–17(g) is the same as that of the seven LEDs. Specifically, from left to right, each of the modules 17(a)–17(g) corresponds to each of the LEDs 33(a)–33(g), respectively. In the preferred embodiment of the invention, the LEDs 33(a)–33(g) are lit in a pattern by the electronics on board the keypad 27 so as to imitate the visual pattern being executed by the signalling devices 20 of the modules 17(a)–17(g).

In the typical layout illustrated in FIG. 2, each of the keys labeled "1", "2", "3" and "4" initiates an operating mode of the control units #1 and #2 that controls each of the signalling devices 20 so as to provide a visual pattern that with the other signalling devices creates a collective visual effect or warning pattern. Each of the warning patterns creates an effect that provides a particular degree of warning suitable for one or more specific situations. For example, the set of four different warning patterns provided by the keys "1", "2", "3" and "4" typically includes a variety of visual effects that vary from patterns for "hot pursuit" at high rates of speed to patterns appropriate for warning others when the emergency vehicle 11 is stopped on the side of a road. In the illustrated layout, the operating modes initiated in response to keystrokes to the keys "1", "2", "3" or "4" typically involve rotating, flashing or oscillating light patterns generated by the devices 20.

The signalling devices 20 can also be controlled to provide non-warning functions such as flooding specific areas with light. For example, in the layout of the keypad 27 illustrated in FIG. 2, three keys provide steady lights in single directions. A keystroke to the key labeled "Take Down" rotates the reflectors 19 of all seven signalling devices 20 to the same forward direction in order to flood with light the area immediately in front of the vehicle 11. This visual pattern is typically used to illuminate a vehicle that has been pulled over by the emergency vehicle 11, thus the name "Take Down." The signalling devices 20 of the leftmost and rightmost modules 17(a) and 17(g), respectively, can be rotated into a position to function as alley lights. Accordingly, keystrokes to the correspondingly leftmost and rightmost keys in the upper row of the keypad 27 labeled "Left Alley" and "Right Alley", respectively, rotate the reflectors of the signalling devices 20 to reflect light through the ends of the light bar 13.

The signalling devices 20 of the end modules 17(a) and 17(g) may also function as spotlights that can be controlled to slowly sweep an area. For example, a keystroke to the "Left Alley" key first activates the signalling device 20 of the leftmost module 17(a) and rotates the reflector 19 to reflect a beam of light out the side of the light bar 13. The light beam can then be rotated in clockwise and counter-clockwise directions by keystrokes to the "Left Arrow" and "Right Arrow" keys, respectively, thereby effecting the functioning of the signalling device 20 as a search light.

Keystrokes to the foregoing keys result in the execution of "primary" functions by the signalling system, meaning light patterns generated by the signalling devices 20 of the modules 17(a)–17(g). Keystrokes to keys "A", "B" and "C" energize relays within the control unit #1, which apply power to output lines A, B and C, respectively. Each of these lines controls one of several "auxiliary" devices 35 in a conventional manner. Examples of the auxiliary devices 35 are a sequence for flashing the headlights of the vehicle, a trunk lock release and a gun lock release.

In accordance with one important aspect of the invention, each of the signalling devices 20 is responsive to the control units #1 and #2 to provide for the relative rotation of the light 18 and reflector 19 in incremental steps, where each step is of a predetermined arcuate value. A pattern of relative rotation is generated by a sequence of the incremental steps, and the pattern of relative rotation coupled with selective application of power to the light of the signalling device results in a visual warning pattern. By changing the sequence of the incremental steps, the resulting visual pattern is changed. A keystroke to any one of the primary function keys initiates the execution of a visual pattern by one of the signalling devices either alone or in combination with other ones of the devices.

Because each pattern of a signalling device comprises a number of individual incremental rotational steps of relative rotation of the lamp 18 and reflector 19 in either a clockwise or counterclockwise direction, a virtually infinite variety of primary functions can be generated by the seven signalling devices 20 of the modules 17(a)–17(g). Of course, only a limited number of these functions can be accessible at any one time by way of the keys of the keypad 27. In this regard, the set of primary functions available for execution from the keypad 27 illustrated by the legends on the keys of the keypad in FIG. 2 is an example of only one of many possible different sets.

In order for the full versatility of the signalling devices 20 to be realized, the control units #1 and #2 are alternatively operable in programming and operating modes.

In its operating modes, the system executes the set of primary functions and auxiliary functions (auxiliary devices 35) associated with the keys of the keypad 27. In the programming mode, both of the primary and auxiliary functions accessible from the keypad 27 may be changed entirely or modified.

In order to enter the programming mode of the system, one of the keys of the keypad 27 is held down as power is applied to the system. Upon sensing the presence of a keystroke during the power up sequence of the system, the control unit #1 enters the programming mode. A user of the system is prompted that the system is in the programming mode by the flashing of at least one of the LEDs 33(a)–33(g) and/or the LEDs 37 associated with the keys of the keypad 27.

Once the system is in the programming mode, different "layouts" for the keypad 27 can be selected. The term layout is intended to mean the mapping of a set of primary and auxiliary functions onto the keys of the keypad 27. In the illustrated embodiment, one of a plurality of available layouts for the keypad 27 may be selected by a keystroke in the programming mode such that the selected layout defines the primary and/or auxiliary functions for each key. In order to change from one keypad layout to another, a ROM memory 39 contains a plurality of layouts or sets of functions. Any one of the layouts can be selected by a microprocessor-based unit 41 of the control unit #1 in response to an appropriate keystroke and mapped onto the keys of the keypad 27.

Alternatively, the function or functions of just a single one of the keys may be changed in the programming mode. Whether the programming mode operates to replace one layout with another or to reconfigure only one of the keys is determined by initial keystrokes to the keys of the keypad 27 after the programming mode has been entered. The sequence of keystrokes to enter either one of the two types of programming will be described in greater detail hereinafter.

Referring briefly to FIG. 2a, the memory 39 is organized to include a plurality of different layouts or sets of primary and auxiliary functions. Each set includes a word of two data bytes for defining the functions or functions executed by each key. The relative address locations of the words determines what key of the keypad 27 executes the function or functions. For example, the memory as illustrated in FIG. 2a includes seven,(7) sets of primary and auxiliary functions. Each set comprises 12 two-byte words. Each word is identified with a key of the keypad 27 by its relative position in memory such that in FIG. 2a the word #1 of each set may provide the primary and auxiliary functions of the leftmost key in the bottom row of the keypad 27. The first byte of each word defines the primary function executed in response to a keystroke to the key and the second byte defines the auxiliary function executed by a keystroke to the key (if any). Keystrokes to some keys may execute only a primary or auxiliary function, but not both, in which case the first or second byte of a word would be an appropriate data field indicating no primary or secondary function is to be executed.

In the architecture of the illustrated embodiment, the options concerning the layout of the functions on the keypad 27 are limited to the layouts of the seven (7) alternative sets of primary and auxiliary functions provided by the memory 39. On a conceptual basis, however, the invention contemplates other architectures that could allow any desired layout or combination of functions. In order to maintain easy programming of the system, however, the seven (7) sets of functions stored in the memory 39 are intended to comprise the seven most popular combinations of functions and their layouts. As will be explained in greater detail hereinafter, the composition of any selected set and/or its layout on the keypad 27 can be changed if desired in order to give the user access to the full versatility of the inventive system.

It is presently contemplated that a hand-held chart (not shown) provides a reference source for the user in order to determine the necessary keystrokes for selecting a desired set of functions from those stored in the memory 39. Once a set of functions has been selected in the programming mode, templates with the appropriate legends for the layout of the selected set on the keypad 27 can be easily inserted or removed under a membrane cover of the keypad 27 in a conventional manner well known in the art. The above-mentioned hand-held chart may take the form of illustrations of the keypad 27 similar to the illustration of FIG. 2, with each illustration including legends on the faces of the keys indicating the function of each key for one of the sets of functions stored in the memory 39.

In order to tailor a set of selected functions if they are not exactly the combination desired, a second chart (also not shown) includes a written and/or visual description of a variety of different primary functions stored in a memory associated with the control unit #2. Each primary function is referenced to a number that can be entered into the keypad 27 for addressing the desired function in memory in order to substitute it for one of the standard primary functions of the selected set.

Figure 3:
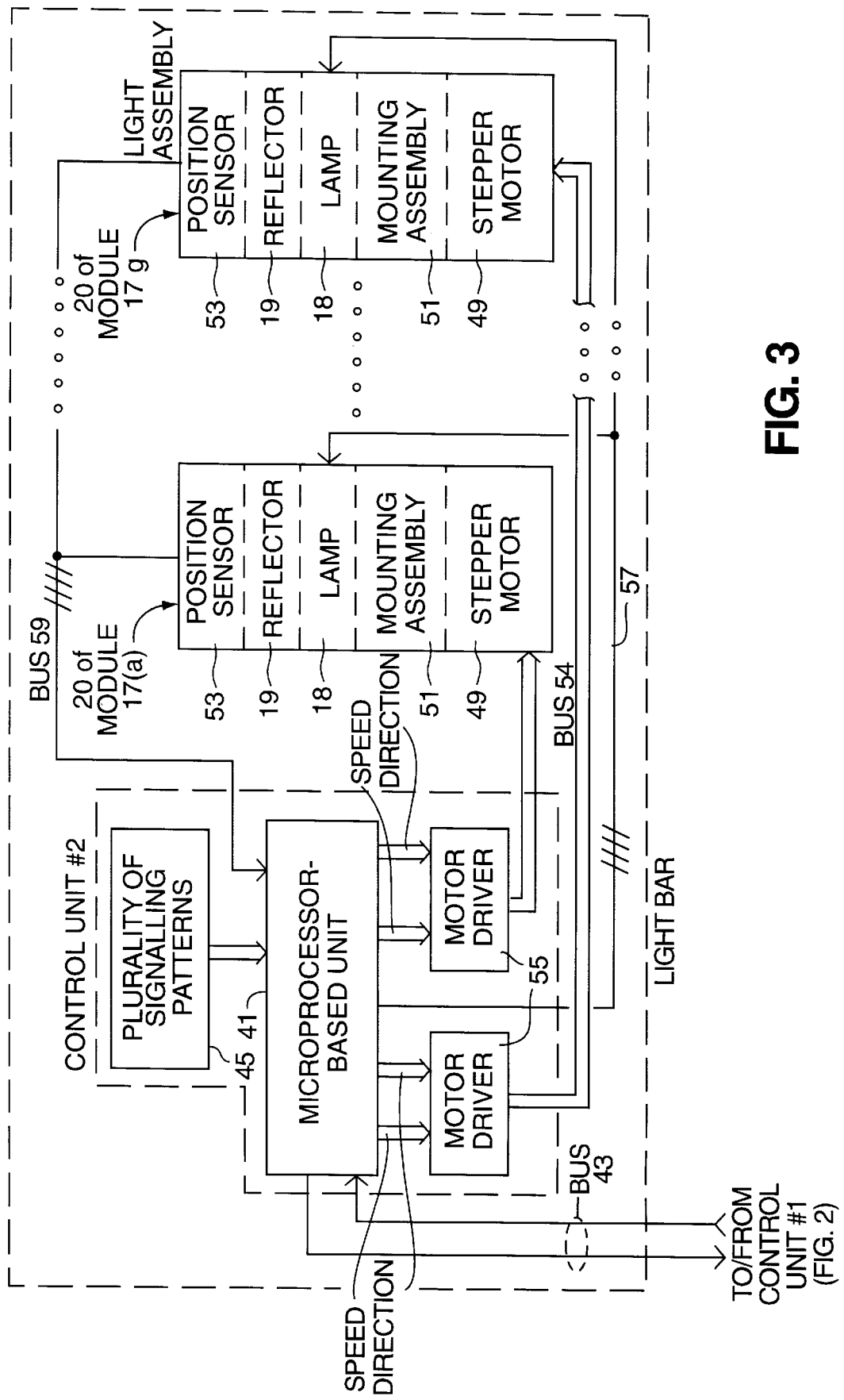
FIG. 3 is a schematic diagram of the portion of the control unit contained within the light bar of FIGS. 1 and 2 in accordance with the preferred embodiment.

The control unit #2 located in the housing 15 of the light bar 13 includes the microprocessor-based unit 41 as illustrated in FIGS. 2 and 3. The microprocessor-based unit 41 communicates with the control unit #1 by way of the cable 31 that comprises a bi-directional serial bus 43. A plurality of possible signalling patterns for each of the seven signalling devices 20 are contained in a memory 45 addressable by the microprocessor-based unit 41.

Figure 3A:
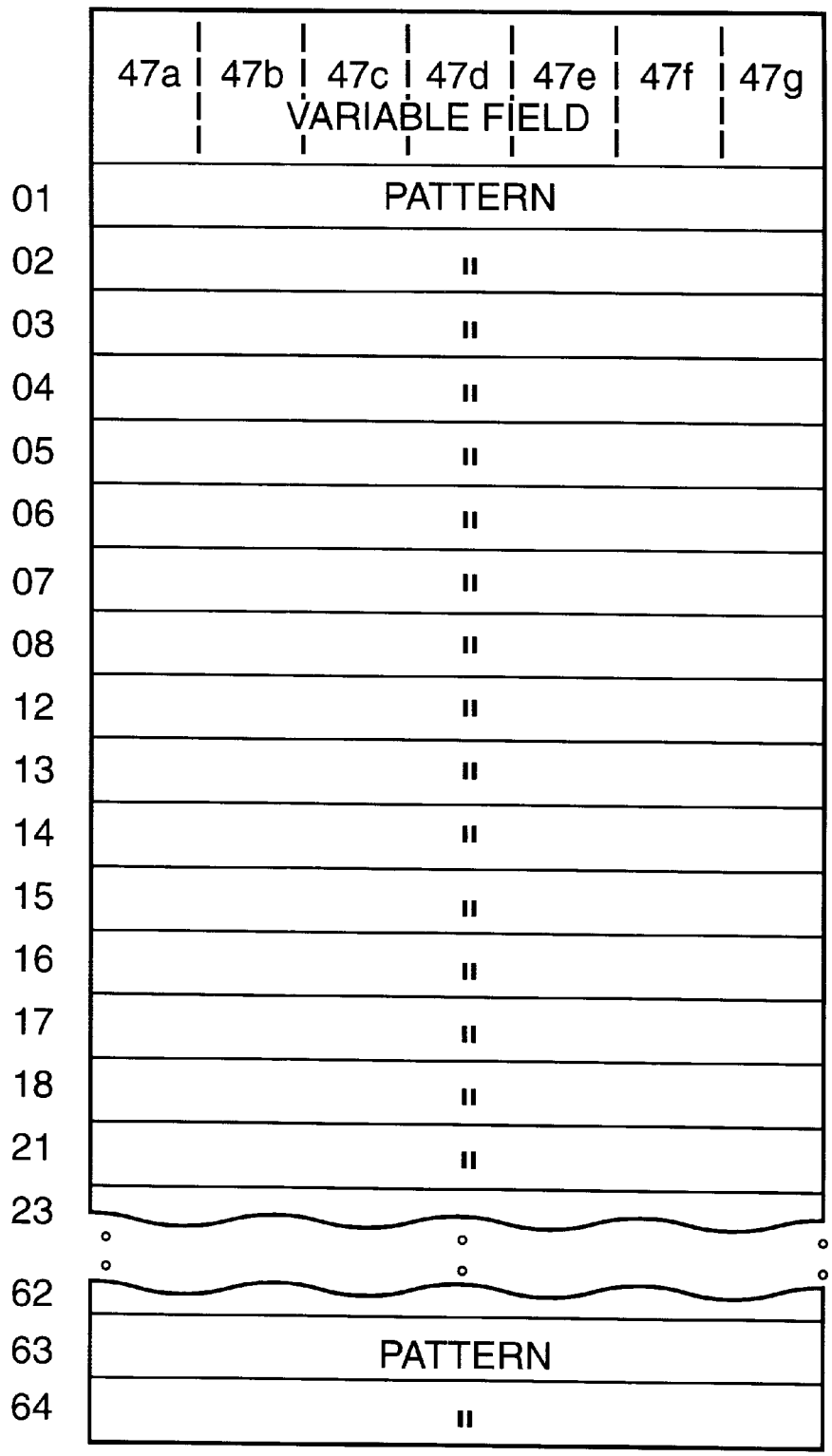

As can best be seen with reference to FIG. 3a, the memory 45 is formatted to include a plurality of visual patterns that can be executed by any one of the signalling devices 20. When the microprocessor-based unit 41 receives a command from the control unit #1 to execute a primary function, it selects the appropriate pattern in the memory 45 for each of the signalling devices 20. The selected patterns are transferred to a variable field of the memory 45, which is used by the microprocessor-based unit 41 to collectively control the signalling devices 20 and generate the desired primary function. The variable field is divided into seven address blocks 47(a)–47(g). Each of the address blocks 47(a)–47(g) corresponds to one of the seven signalling devices 20 such that the pattern transferred to the first block is used to control the signalling device 20 in module 17(a), the pattern transferred to the second block is used to control the signalling device 20 in module 17(b), etc. Each of the patterns stored in the memory 45 comprises an 11 byte word. The bytes individually define the characteristics of the pattern.

As suggested by the schematic block diagram of FIG. 3, each of the signalling devices 20 comprises a motor 49, a mounting assembly 51, the reflector 19, the lamp 18 and a position sensor 53. As discussed more fully hereinafter, the motor 49 preferably directly drives the relative rotation of the reflector 19 and lamp 18—i.e., one full rotation of the motor causes one full rotation of the lamp and reflector.

In the preferred embodiment of the invention, each of the motors 49 of the signalling devices 20 is a stepper motor, which receives speed and direction signals from a bus 54 emanating from a motor driver 55. Each of the motor drivers 55 is a conventional motor driver such as a Sprague Model No. UCN5804B driver that receives the speed and direction commands from the microprocessor-based unit 41. The speed signals from the microprocessor-based unit 41 are in the form of serial digital signals whose frequency is directly proportional to the speed of rotation of the motor 49. The direction signal is a digital signal wherein one state directs rotation of the stepper motor 49 in a counterclockwise direction and the other state directs rotation of the motor in a clockwise direction.

Also emanating from the microprocessor-based unit 41 is a bus 57 that controls each of the lamps 18 of the signalling devices 20. A bus 59 communicates signals from the position sensors 53 of the signalling devices 20 back to the microprocessor-based unit 41.

Briefly digressing, other types of motors such as DC motors may also be used to drive the signalling devices, but they are more likely to require an indirect driving arrangement that is significantly more expensive and complex than the direct drive provided by stepper motors. In any event, the present invention is intended to encompass any type of step-like drive for the signalling devices, regardless of how it is achieved.

As an example of a possible arrangement of the signalling devices 20 using a motor other than a stepper motor, the mounting assembly 51 may include a gear (not shown) mounted to rotate about a vertical axis that includes the longitudinal axis of the lamp 18. The reflector 19 is mounted to the horizontal planar surface of the gear at a position offset from the axis of rotation such that the rotation of the gear orbits the reflector about the lamp 18 and the focal point of the reflector is approximately coincident with the light source of the lamp. The teeth of the gear circumscribe the peripheral boundary of the gear and engage a worm gear that is directly driven by the DC motor. In order for the microprocessor-based system to control the movement of such a signalling device, an optical detector is mounted to sense rotation of the periphery of the gear in order to provide detection pulses as teeth of the gear pass through the detector.

Figure 4:
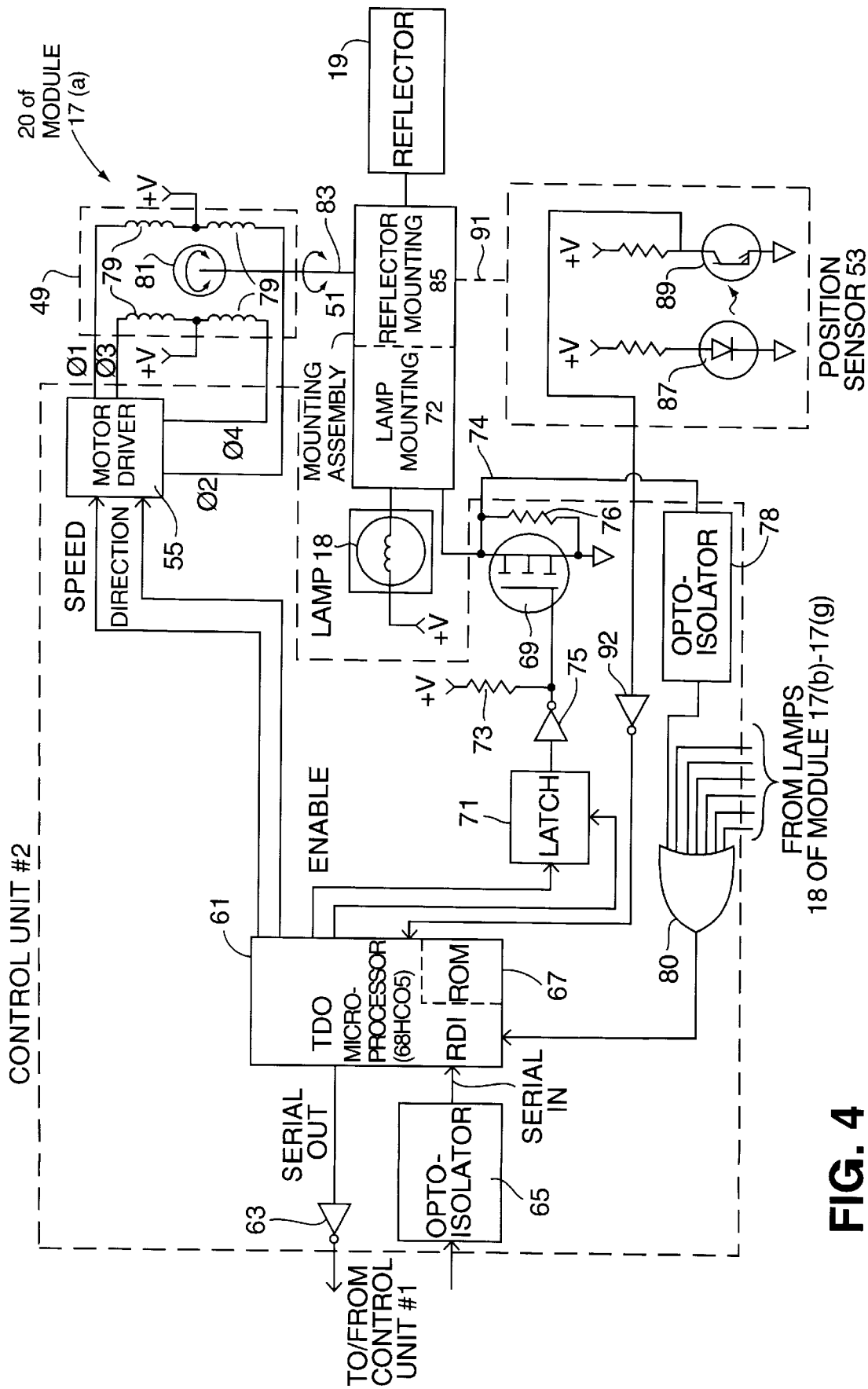
FIG. 4 is a more detailed schematic diagram of the portion of the control unit shown in FIG. 3, including a detailed illustration of the circuitry for controlling one of the signalling devices.

Turning to a more detailed discussion of the microprocessor-based unit 41 and referring to FIG. 4, a microprocessor 61 of the unit is preferably the MC68HC05C8, manufactured by Motorola, Inc. of Austin, Tex. Serial data is communicated between the microprocessor 61 and the control unit #1 via input line RDI and output line TDO. These two lines are connected to the cable 31 in a conventional manner via buffer 63 and opto-isolator 65. A read-only memory 67 (ROM) incorporated into the microprocessor 61 includes the memory 67 as well as part of the necessary software for the control units #1 and #2 to execute the functions set forth in the flow diagrams of FIGS. 8–10.

It will be appreciated from an inspection of FIG. 4 together with a consideration of the block diagram of FIG. 3 that the illustrated inputs/outputs between the microprocessor 61 and the illustrated signalling device 20 of module 17(a) are repeated for each of the other signalling devices 20 in modules 17(b)–17(g). Because these input/output connections are repeated, only the ones for signalling device 20 of module 17(a) are illustrated and discussed in detail hereinafter.

A field effect transistor 69 (FET) functions as a switch responsive to an enable signal from the microprocessor 61 to turn on and off the lamp 18 of the signalling device 20. The enable signal is applied to the FET 69 by way of a latch 71 responsive to a strobe signal from the microprocessor 61. The drain of the FET 69 is connected to ground and the source is connected to the lamp via mounting 72 as explained more fully in connection with FIGS. 7a–7c.

The status of the lamp 18 (i.e., burned out or normal) is determined by the microprocessor 61 by sensing the voltage at the source of the FET 69 when the lamp is turned off—i.e., the FET is off. If the lamp 18 is normal, its filament conducts the voltage +V to the source of the FET. Thus, a healthy lamp 18 will provide a signal of +V volts on line 74 when the FET is off. If the lamp 18 is burned out, the line 74 will be at zero volts because of biasing resistor 76, which has a high ohmic value such as one megohm. In order to provide the signal on line 74 to the microprocessor 61, an opto-isolator 78 first provides a buffer to protect the microprocessor from transients. The signal is then delivered to one of seven (7) inputs of an OR gate 80 whose output is received by the Microprocessor 61. The six (6) remaining inputs of the OR gate 80 are connected to the six other lamps 18 and FETs 69 of the modules 17(b)–17(g).

If a ground or zero volt signal is detected on line 74 by the microprocessor 61, a signal is delivered to the control unit #1 via cable 31, which in turn provides a signal to the control head 21 for the purpose of generating an audio tone that warns the operator of the vehicle 11 that a lamp 18 is burned out. As discussed hereinafter in connection with FIG. 6, a piezoelectric transducer 127 is housed in the control head 21 and generates the audio tone.

Position sensor 53 detects the rotation of the reflector 19 through a predetermined position in its orbit. The detection signal is returned to the microprocessor 61 for use in controlling the on/off status of the lamp 18 and the position of the reflector 19. Also, the detection signal can be used to confirm that the motor is operating properly. In a conventional manner, a pull-up resistor 73 and a buffer 75 are provided between the output of the latch 71 and the base of the FET 69.

The digital speed and direction signals serially received by the motor driver 55 control the four-phase outputs $\emptyset1$, $\emptyset2$, $\emptyset3$, and $\emptyset4$ that directly drive the stator windings 79 as illustrated. In a conventional fashion, a rotor 81 of the stepper motor 49 rotates in arcuate steps in response to the changing signals at the four-phase outputs of the driver 55 such that the arcuate steps are each of approximately the same size. As is well-known and standard for controlling stepper motors, the time sequence in which the four-phase outputs apply power to the windings 79 controls the direction of rotation for the rotor 81 and the frequency of the time sequence controls its speed.

Although not shown in FIG. 4, a current limiting resistor is typically connected in series between the power supply for the motor 49 and the windings 79 of the motor in order to protect the motor from damage. In order to quickly accelerate or decelerate the motor, however, it would be useful to shunt the resistor in order to apply full power directly to the motor. Because accelerating or decelerating take only a short time (e.g., one second), application of full power for such a time period should not harm the motor. Also, at high rotational speeds, the impedance of the motor is sufficiently great that the power supply can be directly applied to the motor 49 in a continuous manner without damaging the motor. By providing a switch to effect the shunting of the resistor, the motor 49 can be provided more torque for faster transitions between on and off states and for high speed operation. In keeping with the invention, the switch for each motor 49 would be controlled by the microprocessor 61 of the control unit #2 in conjunction with the microprocessor-based unit of the control unit #1.

The shaft 83 of the rotor 81 directly drives a reflector mounting 85 of the mounting assembly 51 which in turn moves the reflector 19 in its orbit about the lamp 18. As the reflector mounting 85 rotates in response to the rotation of the rotor 81, a portion of it cuts a beam of light emanating from a photodiode 87 and bridging the photodiode and a phototransistor 89 as suggested by the dashed line 91. The photodiode 87 and phototransistor 89 comprise the position sensor 53 and are mounted in the signalling device 20 to remain stationary as the reflector mounting 85 and the reflector 19 rotate. When the reflector mounting 85 passes the location of the position sensor 53, the light beam is broken and the phototransistor 89 changes states, thereby generating a pulse to the microprocessor 61 by way of a conventional buffer 92.

Figure 5:
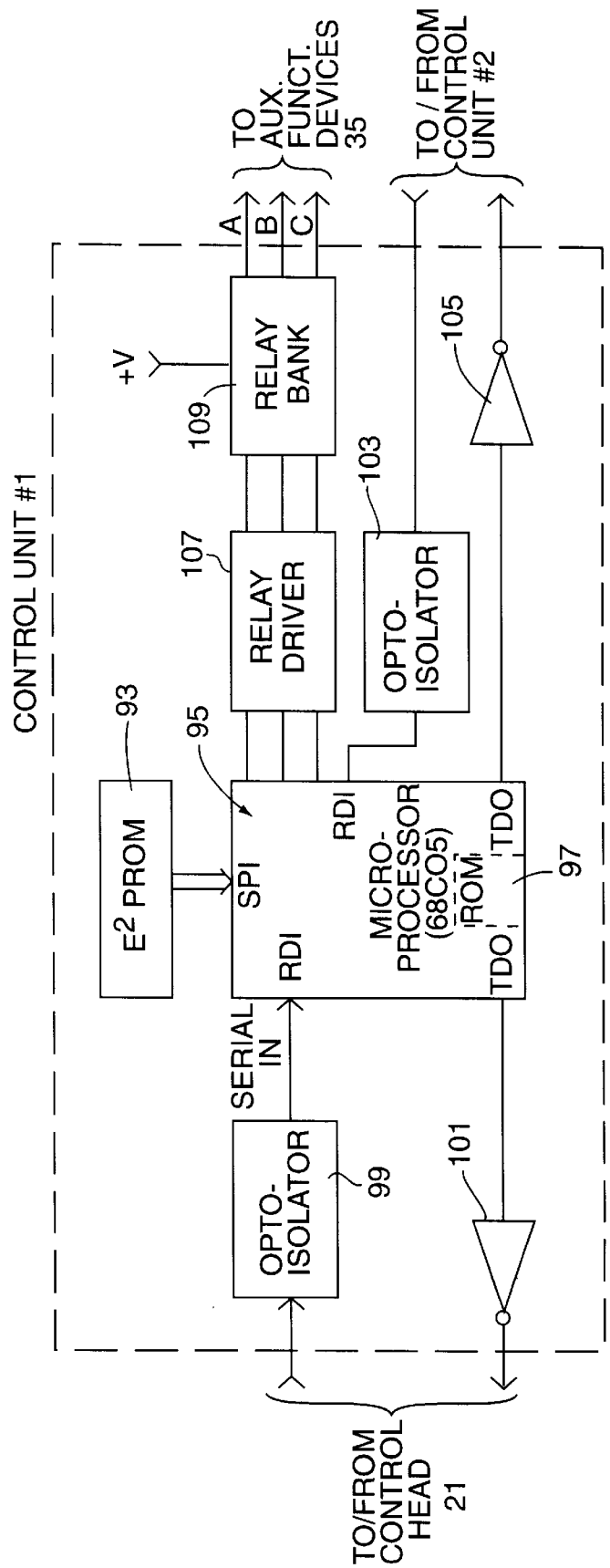
FIG. 5 is a schematic diagram of the portion of the control unit contained within the vehicle and connected to the portion of the control unit in the light bar by serial data lines.

As with the control unit #2, the control unit #1 is also microprocessor based and as illustrated in FIG. 5 preferably also incorporates a 68HC05C8 by Motorola, Inc. of Austin, Tex. The selected layout or set of functions accessible from the keypad 27 in the operating mode is contained in an $E^2PROM$ 93 connected to the microprocessor 95 via data lines SPI. A ROM 97 incorporated into the microprocessor 95 controls the functioning of the microprocessor in a manner that complements the functioning of the microprocessor 61 of the control unit #2 so that the functions of the flow diagrams of FIGS. 8–9 are executed. Also, the ROM 97 incorporates the memory 39 of FIG. 2 in that the different layouts or sets of functions for the keypad 27 are contained in the ROM. On a system level, the microprocessors 61 and 95 of the control units #1 and #2, respectively, may be viewed as being in a master/slave relationship, where the microprocessor 95 is the master processor and the microprocessor 61 is the slave processor.

To communicate with the control unit #2 and the control head 21, two pairs of transmit and receive lines of the microprocessor 95 are each coupled to one of the cables 29 or 31 by way of an opto-isolator and a buffer. Specifically, one pair of receive and transmit lines RDI and TDO is coupled to the cable 29 by way of opto-isolator 99 and buffer 101, respectively, in order for the microprocessor 95 of the control unit #1 to communicate with the control head 21. Similarly, the other pair of receive and transmit lines RDI and TDO is coupled to the cable 31 by way of opto-isolator 103 and buffer 105, respectively, in order for the microprocessor 95 to communicate with the microprocessor 61 of the control unit #2.

In response to keystrokes at the keypad 27 when the system is in the operating mode, the microprocessor 95 of the control unit #1 receives data at its one RDI input from the control head 21. From a selected set of functions in the ROM 97, the microprocessor 95 determines what primary and/or auxiliary functions are associated with a keystroke. If an auxiliary function has been identified, the microprocessor 95 issues appropriate commands to a relay driver 107 and a bank of relays 109 in order to execute one of the auxiliary functions A, B and C. If a primary function has been identified, it is sent to the microprocessor 61 of the control unit #2 so that the individual patterns comprising the primary function can be determined and assigned to each of the signalling devices 20 as previously discussed. The microprocessor 95 of the control unit #1 also transmits the identity of the primary function to the control head 21 so that the LEDs 33(a)–33(g) can be controlled in a manner to mimic the visual pattern generated by the signalling devices 20.

Figure 6:
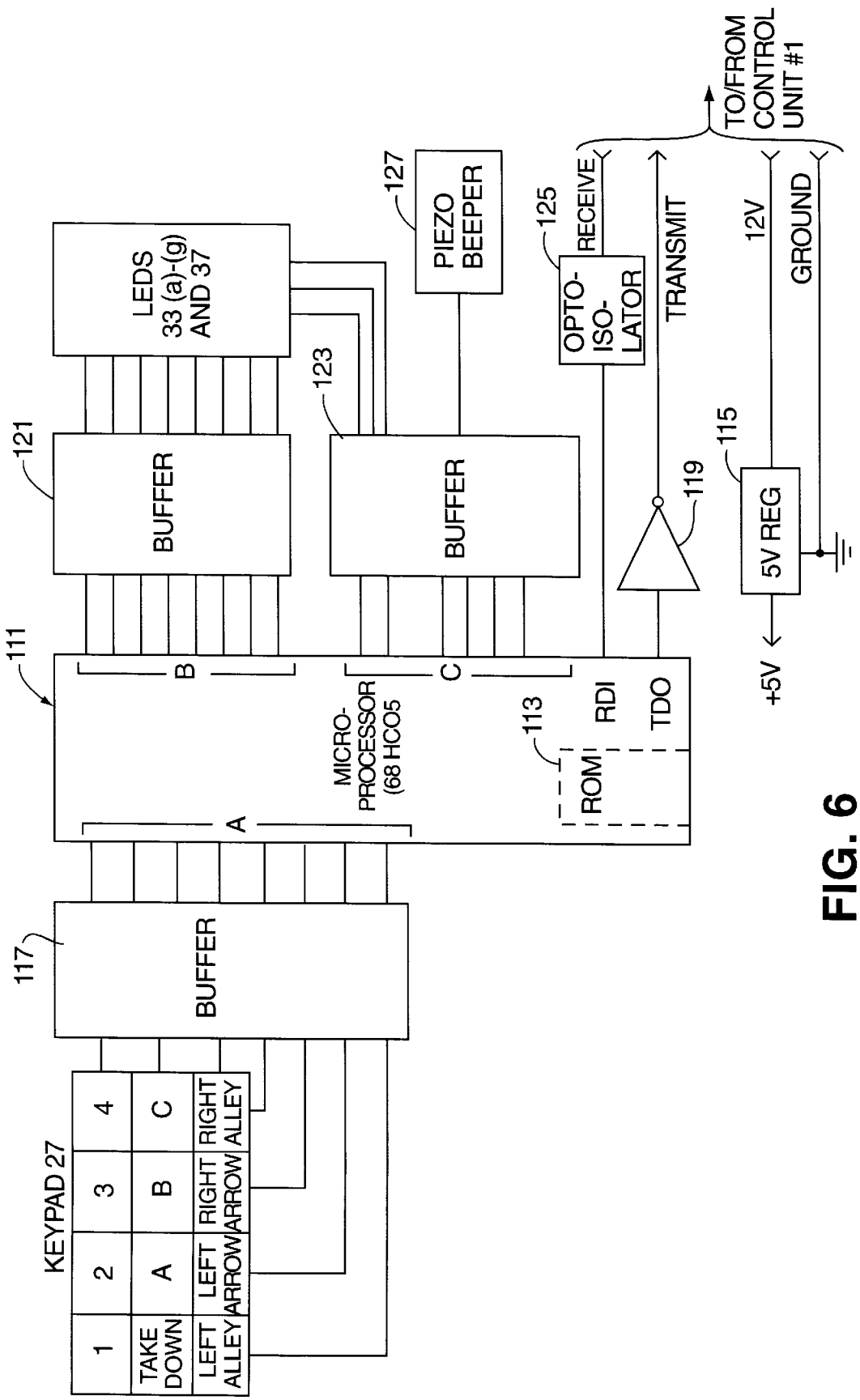
FIG. 6 is a schematic diagram of the circuitry comprising the control head of the control unit and the bi-directional serial data lines connecting the control head to the portion of the control unit contained within the vehicle.

Turning to the electronics of the control head 21 as illustrated in FIG. 6, a third microprocessor 111 controls the keypad 27 and cooperates with the microprocessor 95 of the control unit #1 to execute primary and auxiliary functions selected by keystrokes to the keypad 27 or program the system in response to keystrokes, depending on whether the system and particularly the microprocessor 95 are in the operating or programming mode. Like the relationship between the microprocessor 95 of the control unit #1 and the microprocessor 61 of the control unit #2, the microprocessor 111 of, the control head 21 may be viewed as being in a master/slave relationship with the microprocessor 95 of the control unit #1. In response to a keystroke to a key of the keypad 27, the microprocessor 111 transmits on line TDO a serial data stream to the microprocessor 95, informing the latter that a particular key has been pressed. Depending on whether the system is in its operating or programming mode, the microprocessor 95 either 1) executes an auxiliary function identified with the key and/or instructs the microprocessor 61 to execute a particular primary function or 2) changes the composition and/or layout of the set of functions accessible from the control head 21 when the system is in the operating mode.

The microprocessor 111 of the control head 21 executes a program stored in a ROM 113 internal to the microprocessor as shown in FIG. 6. A regulator circuit 115 receives power from the control unit #1 and converts it to a regulated five (5) volts to power the microprocessor 111 and the associated circuitry in the control head 21. Input ports "A" to the microprocessor 111 receive keystroke signals from the keypad 27. The keypad 27 is laid out as a three-by-four matrix that is buffered by a conventional buffer 117 such as a 74LS240 manufactured by Texas Instruments, Dallas, Tex.

The microprocessor 111 identifies which key in the matrix has been pressed and transmits the identity of the key to the microprocessor 95 from its TDO output via transmit buffer 119 and cable 29. Also, the LEDs 37 associated with the keys of the keypad 27 are controlled by the microprocessors 111 and 95 in response to keystrokes so that the user is prompted regarding system status. Various prompting schemes may be employed for this purpose.

The LEDs 37 and 33(a)–33(g) are configured in an eight-by-three matrix connected to output ports "B" and "C" of the microprocessor 111 by way of a conventional buffers 121 and 123, respectively. The eight rows of the matrix are controlled by the output ports "B", whereas the three columns of control lines are controlled by the output ports "C". Two of the three control lines comprising the columns of the matrix control the LEDs 37 of the keys, and the other line control the LEDs 33(a)–33(g) for mimicking the visual pattern of a selected primary function. The microprocessor 111 receives the identity of the primary function being executed by the signalling devices 20 at its RDI input Via cable 29 and an opto-isolator 125. Under program control, the microprocessor 111 responds to the identity of the primary function by executing an appropriate one of a plurality of LED patterns stored in ROM 113. A piezoelectric transducer 127 is powered by the microprocessor 111 by way of the buffer 123. The transducer 127 provides an audio tone in response to the detection of a burned out lamp 18 as discussed in connection with FIG. 4.

Figure 7A:
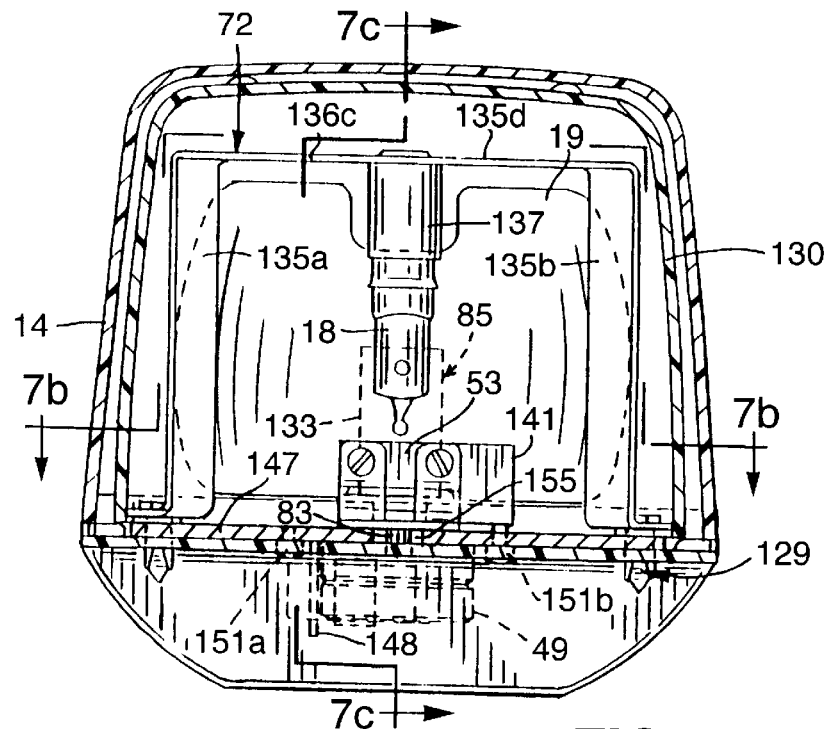
Figure 7B:
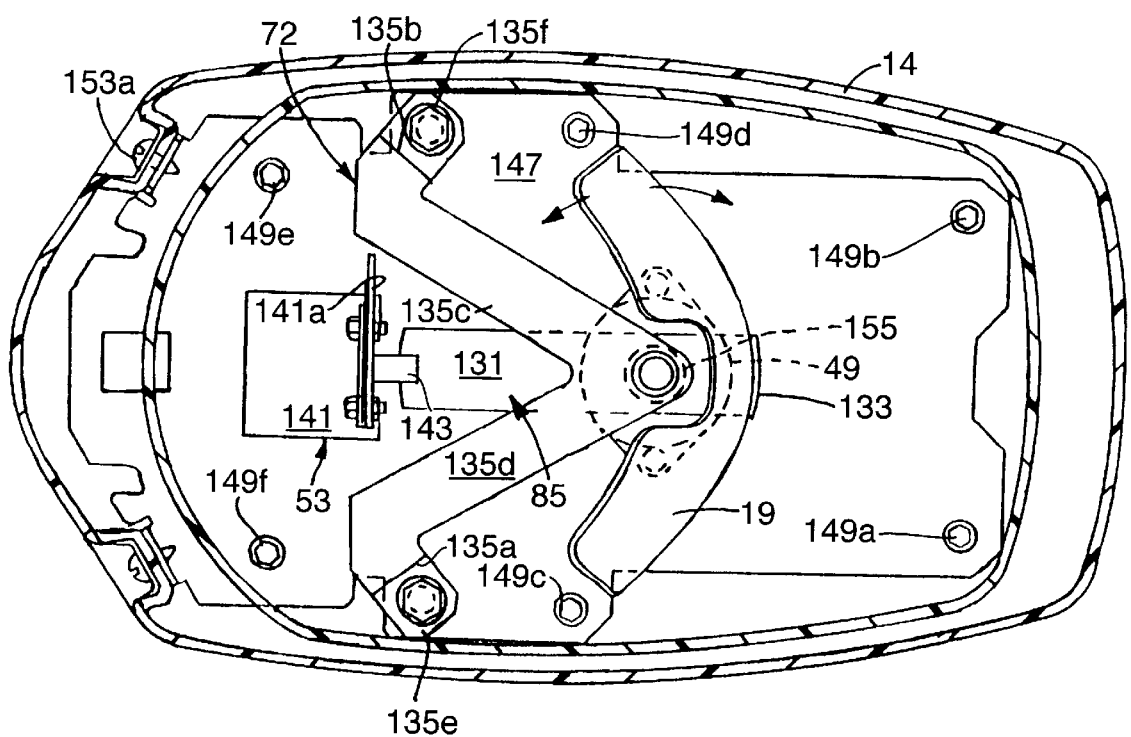
Figure 7C:
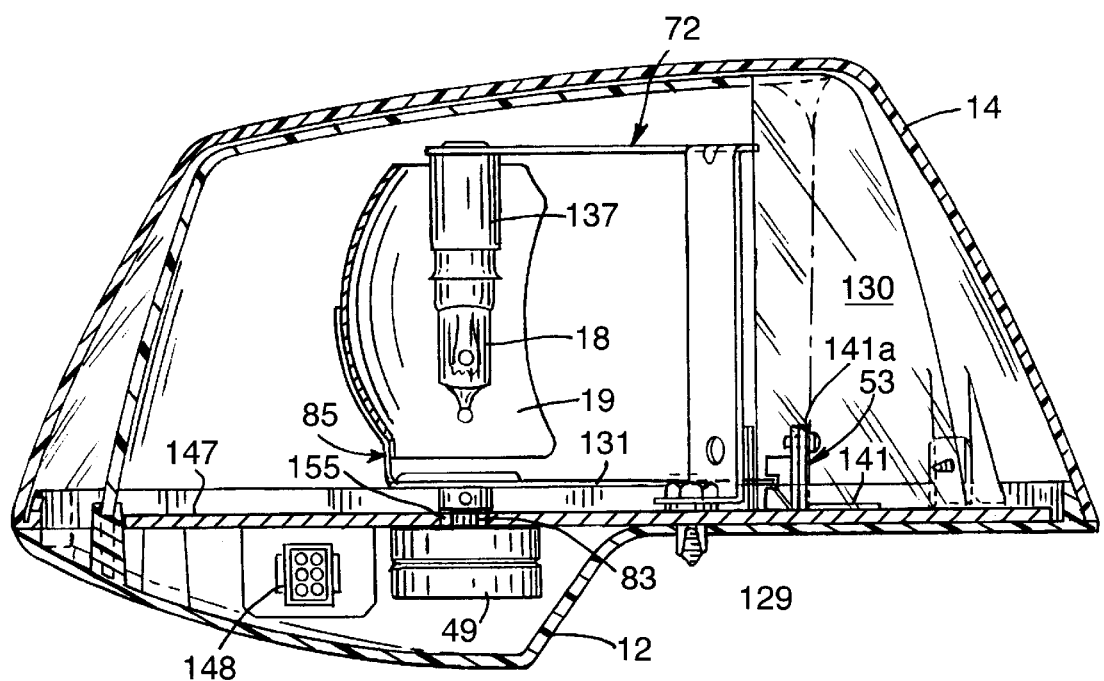

Referring now to the structure of the signalling devices 20 and their modules 17(a)–17(g), FIGS. 7a–7c illustrate the detailed construction of an exemplary one of the signalling devices 20 and modules illustrated in FIG. 1a. As previously indicated, each of the signalling devices 20 is identical to the others. Similarly, the modules 17(a)–17(g) are identical except for differences in their shape necessary to accommodate their mountings on different areas of the frame 16.

As previously indicated, a stepper motor 49 directly drives the mounting 85 for the reflector 19. In order to directly drive the reflector 19 and its mounting assembly 85, the motor 49 is mounted in a cavity of the base section 12 of the module 17(g) such that the drive shaft 83 of the motor projects along a vertical axis through the base section.

The mounting assembly 85 for the reflector 19 is fixed to the end of the drive shaft 83 so that the assembly and reflector rotate with the shaft. The shaft 83 of, the stepper motor 49 rotates in arcuate steps and, because the mounting assembly 85 and reflector 19 are secured to the shaft, they also rotate in arcuate steps. The mounting assembly 85 extends horizontally in one direction to define an extension 131 that interacts with the position sensor 53 in order to provide a reference signal to the microprocessor 61 for the rotation of the reflector 19 about the lamp 18. For the reflector 19 to orbit the lamp 18 as the shaft 83 of the stepper motor 49 rotates, the reflector is mounted to the mounting assembly 83 at a position that is offset from the vertical axis of rotation defined by the shaft. The amount of offset defines the radius of the orbit for the reflector 19 and positions the reflector so that its focal point is coincident with the position of the lamp 18. The direction and speed of the arcuate steps executed by the stepper motor 49, the mounting assembly 85 and the reflector 19 are controlled by the system as previously explained.

The mounting assembly 85 for the reflector 19 is generally L-shaped as illustrated and formed from 0.040 inch thick C-1008 or C-1010 cold rolled steel. The reflector 19 is spot welded to an upright arm 133 of the mounting assembly 85 so that the reflector is offset from the axis of rotation as previously mentioned. The reflector 19 is made of 3003 aluminum and has a conventional surface contour of a paraboloid. A finish is placed on the surface of the reflector 19 so that it has a beam of relatively intermediate width and sufficient candle intensity on and off the axis of the paraboloid such that both narrow and broad beam intensity requirements are met. To ensure sufficient beam width, the finish of the reflector is prepared using a conventional chemical dipping and anodizing process, commonly called "bright dipping." With a sufficiently broad beam width and bright light source for the lamp 18, the signalling device is able to meet the photometric requirements (e.g., SAE requirements) for all the patterns commonly made by different types of conventional rotators.

The lamp 18 is suspended above the axis of rotation for the reflector 19 by the lamp mounting assembly 72. The assembly 72 includes a conventional lamp socket 137 for receiving a 50 watt halogen lamp, which is the preferred light source. A 50 watt halogen light has sufficient intensity to satisfy on-axis photometric requirements for any pattern the signalling device may be asked to execute while complementing the beam width of the reflector 19 to also meet or exceed beam width photometric requirements for any pattern. Also, a 50 watt halogen lamp for each of the signalling devices 20 is a practical power level that can be supported by the electrical system of the vehicle 11, assuming that the number of signalling devices in a light bar is not excessive.

In each of the modules 17(a)–17(g) of the seven signalling devices 20, a plate 147 in the base section 12 provides structural support for mounting the devices. The plate 147 in turn is secured to the base section 12 by six (6) screws 149a–149f. The stepper motor 49 is mounted to the underside of the plate 147 by two screws 151a and 151b and its shaft projects through a hole 155 in the plate.

To support the lamp 18 and lamp socket 137 above and along the axis of rotation and focal point of the reflector 19, the lamp mounting 72 includes a one-piece frame comprising two legs 135a and 135b, each supporting a cantilevered arm 135c and 135d that is joined at its end to the other arm. The joint formed by the mating of these two arms 135c and 135d secures the lamp socket 137 over the axis of rotation. The mounting assembly 72 is formed from 0.059 inch thick 1008 or 1010 cold rolled steel. The legs 135a and 135b are oriented so as to present a minimum profile to the light radiating from the lamp 18. Each of the legs 135c and 135d includes a foot 135e and 135f, respectively, for securing the mounting 135 to the plate 147 of the module. Each foot 135e and 135f is secured to the plate 147 by way of an expanding nylon fastener and screw combination 129. The nylon fastener allows the assembly 72 to be electrically common with the lamp socket 137 in that the fasteners electrically insulate the assembly from the plate 147. As explained in connection with FIG. 4, the lamp 18 is energized by grounding the socket 137 and assembly 72 by way of the FET 69.

The position sensor 53 is mounted to a bracket 141 that is spot welded to the plate 147. Two screws hold the sensor to a vertical face 141a of the bracket 141 so that the extension 131 of the reflector mounting passes through the gap and breaks the beam between the phototransistor and photodiode of the position sensor as best seen in FIGS. 7b–7c.

Each of the modules 17(a)–17(g) of the light bar 13 includes a dome 14 of transparent plastic material such as lens grade polycarbonate plastic. To form one of the modules 17(a)–17(g), the dome 14 is mounted to the base section 12 by way of a tongue-and-slot arrangement (not shown) at the fronts of the modules and screws 153a–b at their backs. With the domes 14 in place, the signalling devices 20 are isolated from the elements of the ambient environment. Under each of the domes 14, a color filter 130 may be provided.

Wires (not shown) from the control unit #2 in the housing 15 of the light bar 13 are fed to the motor 49 and lamp socket 137 of each signalling device via a cavity in the frame 16. Similarly, wires from the position sensors 53 are fed back to the control unit #2 by way of the cavity. The wire to the socket 137 for the lamp 18 is secured to one of the legs 135a or 135b of the lamp mounting 135 and passes from the cavity of the frame 16 to the interior of the dome 14 by way of a hole (not shown) in the base section 12 and plate 147. A connector 148 mounted to the underside of the plate 147 interfaces the wiring of the signalling device 20 and the wiring from the control unit #2.

The control units #1 and #2 execute programs stored in the ROMs 67 and 97 integrated into the microprocessors 61 and 95, respectively. Together, the control units #1 and #2 execute the logic of the flow diagram for the operating mode in FIGS. 8–9. In response to the appropriate keystrokes to the keypad 27 of the control head 21, the control units #1 and #2 execute the logic of the programming mode illustrated in the flow diagram of FIG. 10.

Figure 8A:
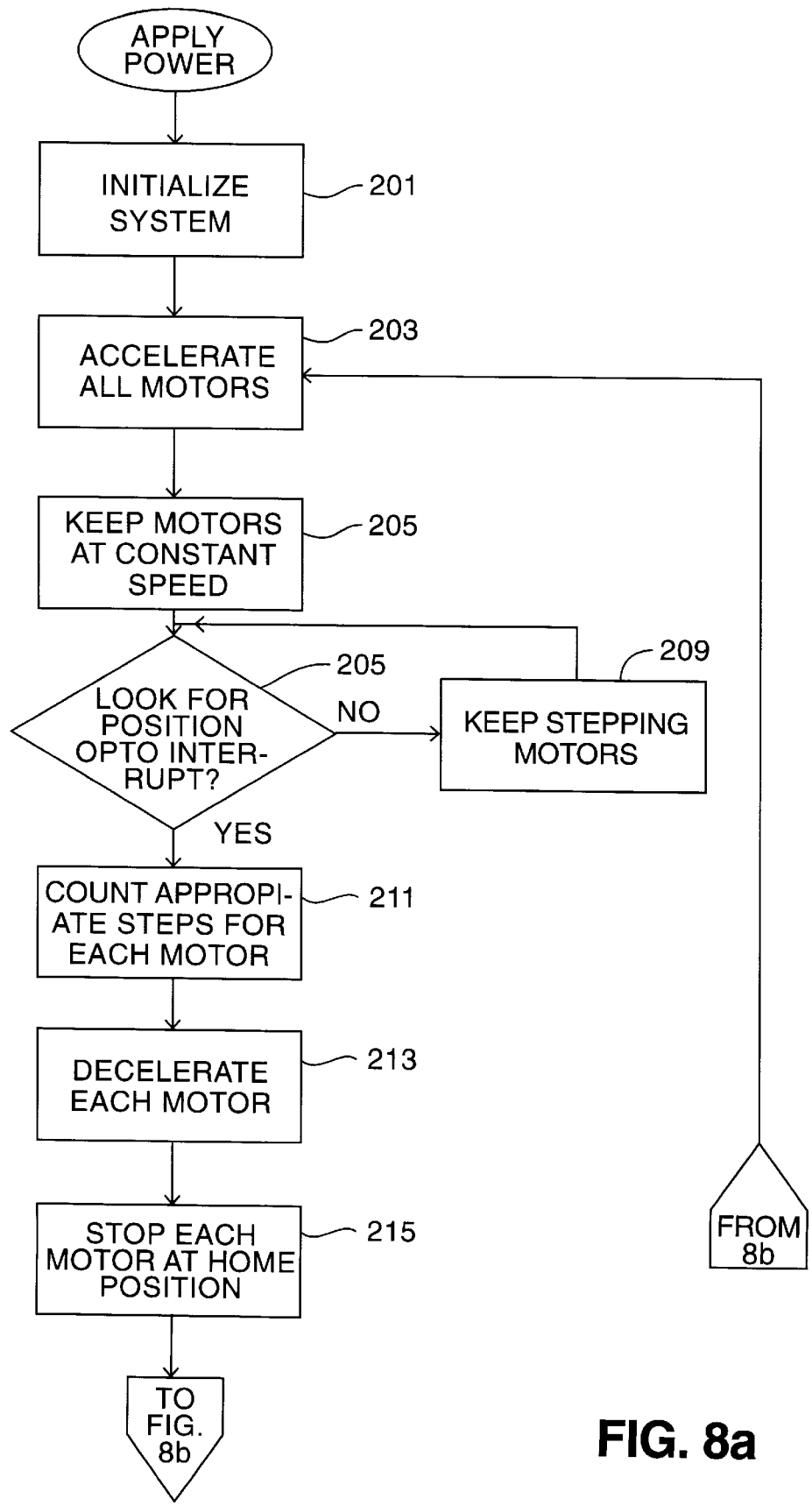
FIGS. 8a–8b are a flowchart diagram of a program executed by the control unit in order to implement an operating mode of the system where any one of a group of visual patterns may be executed by the signalling devices.
Figure 8B:
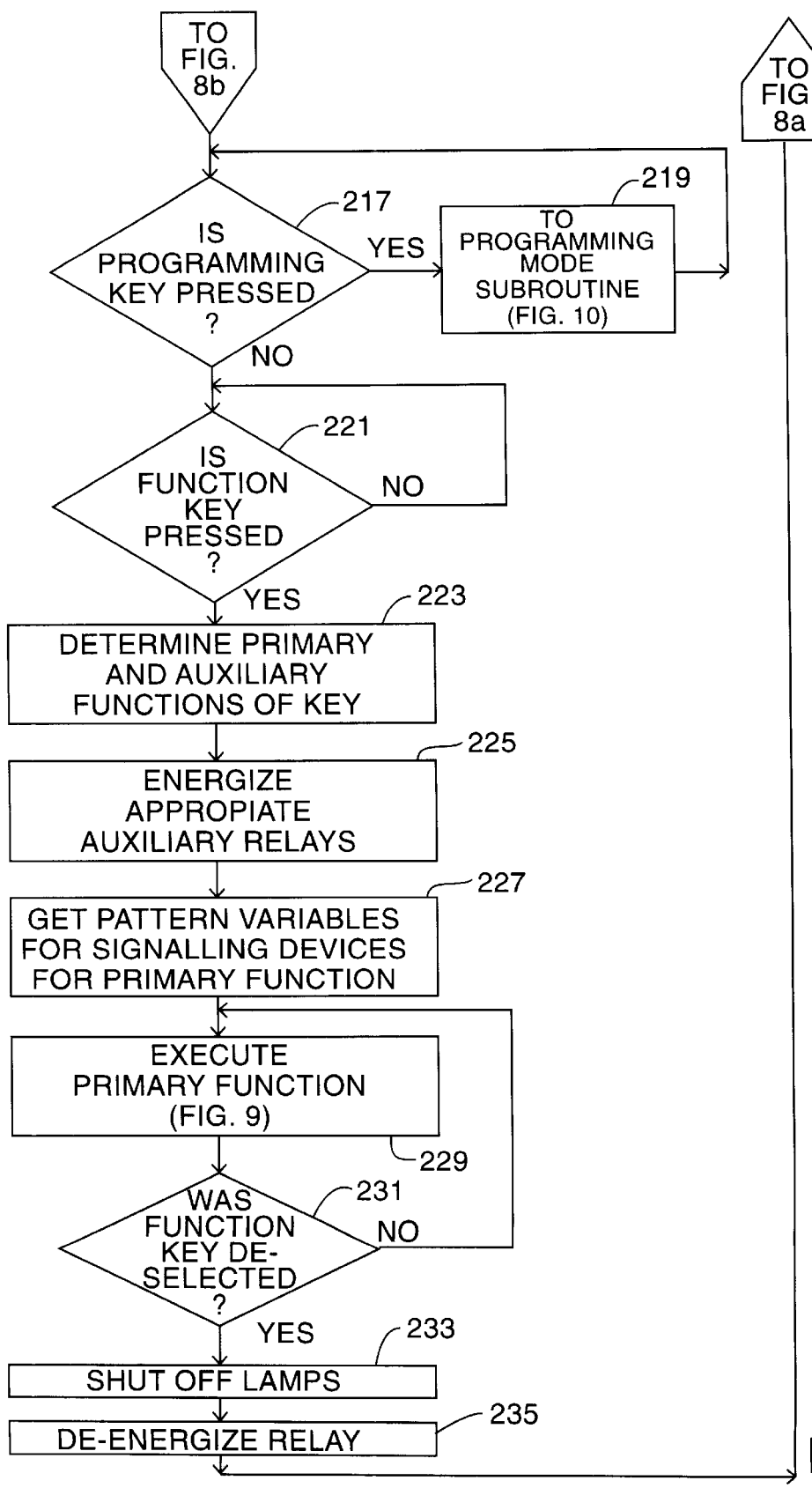
Figure 9:
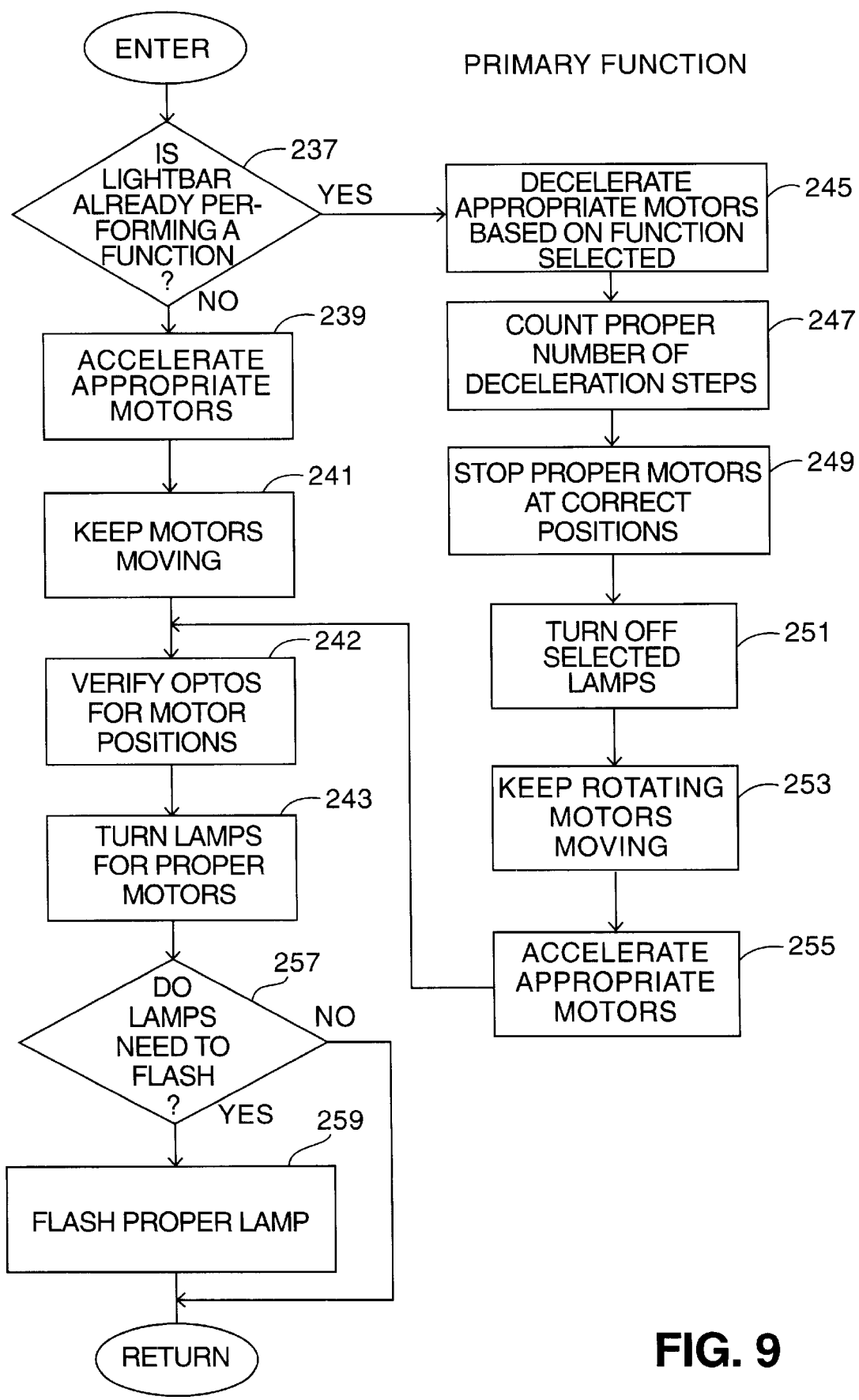
FIG. 9 is a more detailed flowchart diagram of the program executed by the control unit in the operating mode for causing the signalling devices to produce a selected visual pattern.

Upon application of power to the system, the system is electrically and electromechanically initialized in steps 201–215 of FIG. 8a. Specifically, in step 201, the electronics of the system is initialized upon application of power. The motors 49 of all the signalling devices 20 are advanced at a constant speed in steps 203–205. The motors 49 maintain the step rotation of the reflectors 19 in steps 207–209 until the position sensors 53 indicate the reflectors have rotated through a predetermined position as defined by the positions of the position sensors. For each of the signalling devices 20, an appropriate number of steps are executed by the motor 49 in step 211 after the position sensor 53 has detected the rotation of the reflector 19. After these appropriate number of steps have been executed by the motor 49, the system decelerates the motor and stops the rotation of the reflector 19 at a position defined as the "home position" in steps 213 and 215.

As presently contemplated, the system enters the programming mode if a keystroke is detected at the lower leftmost key of the keypad 27 during the power-up initialization of the system. In the operating mode, this key provides a reset function. Its LED 37 is always lit and provides an indication that the system is receiving power.

At step 217, the system branches to a program mode subroutine if it detects the keystroke to the reset key during the initialization process. The programming mode subroutine is executed at step 219 and returns to the main program at the entry of step 217 in order to determine if further programming is to be initiated. A timeout function may be provided at the exit of the programming mode subroutine in order to provide the user of the system with a time window to reenter the subroutine at step 217. Otherwise, the system will branch to step 221 where it determines whether a keystroke has been made to the keypad 27 indicating that an operating mode function should be executed. The system continues to scan the keypad 27 in step 221 until a function key is pressed. When a keystroke is detected, the system first determines which primary and auxiliary functions are associated with the key that was pressed and then executes the functions. The primary and auxiliary functions of the key are identified from the $E^2PROM$ read by the microprocessor 95 in the control unit #1 as previously discussed. If an auxiliary function is associated with the selected key, the system energizes the appropriate relay 109 in step 225. If the selected key is associated with a primary function, the system retrieves the correct combination of patterns to be executed by the signalling devices 20 stored in the ROM 67 of the microprocessor 61 of the control unit #2 as also previously discussed.

With the individual patterns comprising the primary function identified, the system executes the primary function at step 229. At step 231, the system determines if a second keystroke has occurred at the selected key, indicating that the user wishes to terminate the function or functions activated by the key. As long as a second keystroke is not detected, the system remains in a loop between steps 229 and 231 as indicated in the flow diagram. Upon detection of a second keystroke to the selected key, the system initiates the termination of the function or functions by first shutting off the lamps 18 at step 233 if a primary function is being executed and de-energizing the relay 109 step 235 if an auxiliary function is being executed. The system then returns to step 203 of the initialization procedure in order to rotate the reflectors 19 into a predetermined rest position at step 215. The system then rests at step 221 and scans for another keystroke to the keypad 27.

In order to execute a primary function in step 229, the system executes the logical steps of the flow diagram in FIG. 9. First, in step 237 the system determines if the light bar 13 is already performing a visual pattern of a primary function. If the signalling devices 20 are at rest, the system branches to step 239 where the appropriate ones of the motors 49 are accelerated. In step 241, the system maintains the motors in an energized state in accordance with the patterns stored in the ROM 67 of the control unit #2. Similarly, the lamps 18 are turned on and off in accordance with the selected group pattern in step 243.

If the light bar 13 is already providing a visual pattern of a primary function in step 237, the system branches to step 245 where the appropriate ones of the motors 49 are decelerated based on the new primary function identified with the detected keystroke. The motors 49 to be decelerated are stepped to an appropriate rest position in steps 247 and 249. Any of the lamps 18 of the signalling devices 20 that are not active in the visual pattern of the new primary function are turned off in step 251. The motors 49 of the remaining signalling devices 20 that have not been turned off in steps 235–239 are maintained in accordance with the individual patterns of the new primary function in step 253. The motors 49 of any of the signalling devices 20 that are newly selected for the visual pattern of the primary function are accelerated in accordance with the individual patterns in step 255. From step 255, the system branches to step 242 where the system checks the signals from the position sensors 53 to ensure the reflectors 19 are rotating properly. In step 243, the appropriate ones of the lamps 18 are turned on. In step 257, the system determines whether the lamps 18 that have been turned on in step 243 are to be flashed in the selected pattern. If any of the lamps 18 are to be flashed, the system executes the flashing required of the pattern in step 259. Otherwise, the system branches to the step 231 in FIG. 8b.

Figure 10:
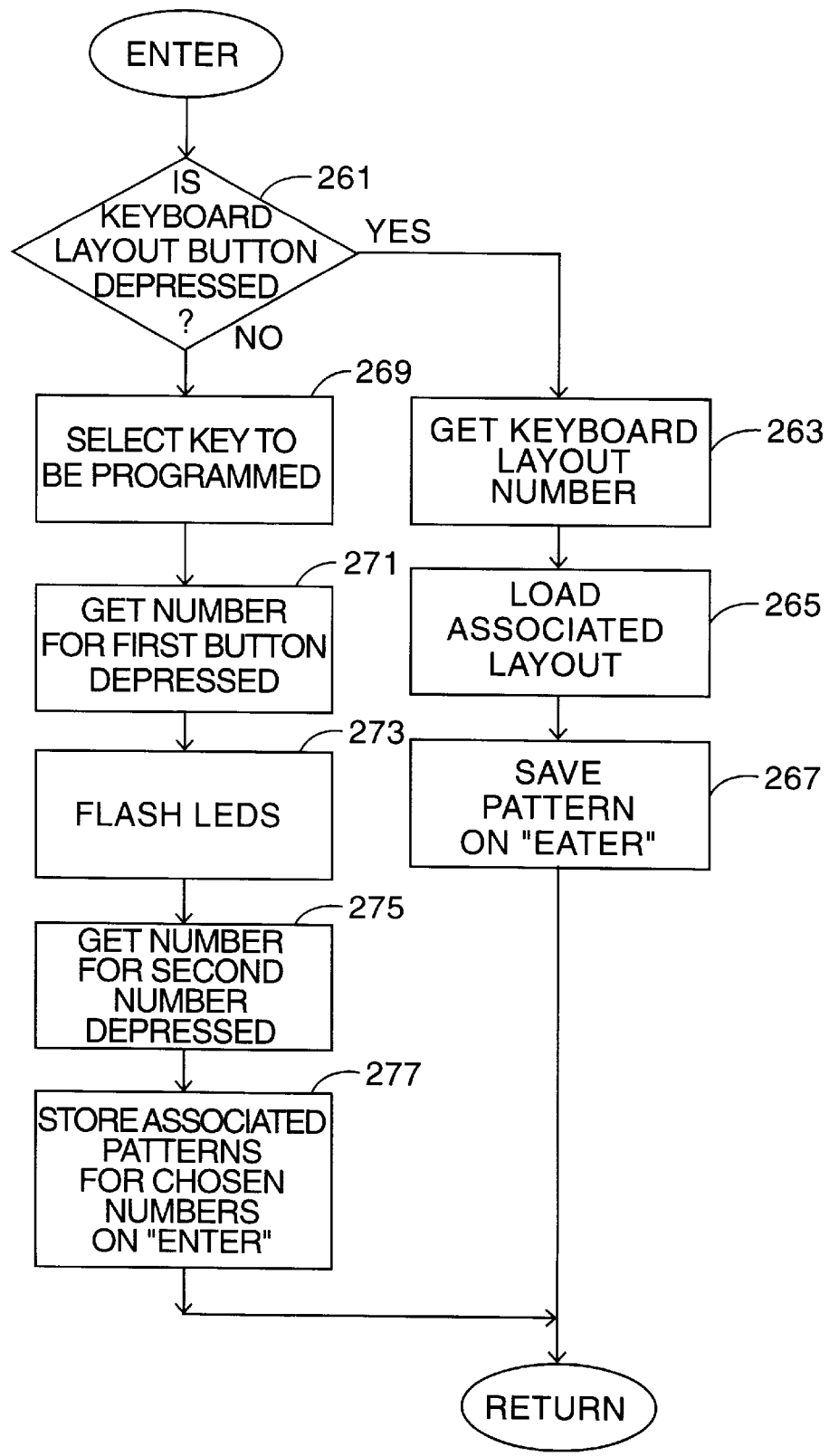
FIG. 10 is a flowchart diagram of a program executed by the control unit in order to implement a programming mode of the system where the composition of the group of visual patterns available in the operating mode may be changed.

If the programming mode of the system has been entered by way of a keystroke to the reset key during the power-up sequence of the system at step 217 and the system branches to the programming mode subroutine in step 219, the flow logic of FIG. 10 is executed in order to change the primary and/or auxiliary functions that may be executed by the system in response to keystrokes. After entering the programming mode subroutine, the system first determines whether the functions of only individual ones of the keys are to be reprogrammed or an entirely different set of functions are to be substituted for those presently associated with the keys of the keypad 27. Specifically, in step 261, the system determines whether an appropriate keystroke to the keys of the keypad 27 after the programming mode has been entered indicates that the programmer wishes to substitute a different set of functions stored in the $E^2PROM$ 93 of the microprocessor 95 in the control unit #1 for the present set of functions.

Because a separate programming keyboard is not contemplated from the programming mode, the two rows of keys on the keypad 27 are identifiable with certain programming functions. For example, in selecting a layout or set of functions in step 263, seven of the eight keys in the bottom row of the keypad 27 are identifiable with the seven (7) alternative layouts or sets of functions that may be selected. The reset key functions as an enter key in the programming mode. Accordingly, the leftmost key in the group of seven keys identifies the first set of functions in memory, the second leftmost key identifies the second set in memory, etc. The programmer is prompted by visual patterns presented on the LEDs 37 of the keys. The prompting is executed by the microprocessor 111 of the control head 17 in response to signals received from the control unit #1 by way of cable 29.

After the initial keystroke in step 261, the rightmost seven (7) of the eight keys in the bottom row of the keypad 27 provide an indication of which one of the seven (7) sets of functions is currently available in the operating mode. If the set available in the operating mode is to be changed, a keystroke to any one of the keys branches the system to step 263 where the associated one of the sets is retrieved from the ROM 97. To prompt the programmer that the system has recognized the keystroke, the LED 33 of the key is lit in response to the keystroke. Once the programmer has selected a desired set for use in the operating mode, a keystroke to the enter key (reset key) causes the system to branch to steps 265 and 267 in order to transfer the selected set of patterns from the ROM 97 to the $E^2PROM$ 93, where the set is accessed in the operating mode.

The seven (7) layouts or sets of functions stored in memory are preferably seven of the most popular combinations of functions. The expectation is that most users will select one of the layouts and will be satisfied with the combination provided by the layout so that further programming of individual keys will not be necessary.

If after entering the programming mode, keystrokes indicate the user wishes an individual key to be programmed, the system branches from step 261 to step 269, where the system recognizes a subsequent keystroke as identifying the key whose functions are to be re-programmed. In steps 271–277, the new primary function of the key is identified. Again, the bottom row of seven keys is contemplated as the group of keys used to identify the new primary function. There are a predetermined number (e.g. 31) of different primary functions that can be programmed for execution by the key. The composition of each of the available primary functions is stored in the ROM 67 in the control unit #2. Each of these primary functions is associated with a two-digit number that is identified on a chart (not shown) available to the programmer. In order to program the primary function number "24", for example, the programmer first presses the fourth key from the left in the bottom row of seven and then the second key from the left. The LEDs 37 of both keys will flash to prompt the programmer the system has recognized the keystrokes. In general, the first keystroke in step 271 identifies the ones digit for the group pattern and the second keystroke identifies the tens digit of the pattern. Because only seven (7) of the keys in the bottom row of the keypad 27 are available for programming, it will be appreciated that the numbers used to identify the available primary functions are limited to numbers that have only 0–7 in their ones and tens digits. Also, numbers having the same ones and tens digit are not available (i.e., 00, 11, 22, 33, etc.) because the system cannot properly prompt the programmer for a double keystroke to the same key.

With the new primary function identified, a keystroke to the reset key (identified as the "enter" key in the programming mode) will cause the system to replace the present primary function associated with the key with the new function identified by the programmer. The programmer may exit the programming mode by a simple second keystroke to the "enter" key. However, if an auxiliary function is to be added to the key or an existing auxiliary function of the key is to be changed, the programmer presses a designated one of the keys in the upper row (i.e., "relay" key).

When programming an individual key, the three leftmost LEDs 33(a)–33(c) prompt the programmer regarding which one of the auxiliary functions, (if any), A, B or C is associated with the selected key. Keystrokes to the relay key in the top row of keys allows the programmer to select one of the auxiliary functions for the key. The LEDs 33(a)–33(c) provides the desired prompting by corresponding to the auxiliary functions as follows: 33(a)-function A, 33(b)-function B and 33(c)-function C. Keystrokes to the relay key sequence the LEDs 33(a)–33(c) through four (4) states. In three of the states, one of the LEDs 33(a)–33(c) is on, indicating an auxiliary function is selected. In the fourth state, all three of the LEDs 33(a)–33(c) are off, indicating no auxiliary function is selected.

A keystroke to one of the other keys in the top row of the keypad 27 will select the functioning of the key as continuously on, timed out or momentary. Specifically, in the operating mode, the system may respond to a keystroke by continuously providing the associated primary and/or auxiliary function, by momentarily providing the functions or providing the functions for a fixed timeout period (e.g., eight (8) seconds). Sequential keystrokes to the one key in the top row selects one of the three functioning options. The rightmost three LEDs 33(d)–33(g) prompt the programmer as to which of the functioning options is presently identified.

With the selected key fully programmed, the programmer may examine the status of the LEDs 33(a)–33(g) and 37 to confirm the selections that have been made are correct. If they are correct, the enter key is pressed and the programmed key is assigned the new primary and/or auxiliary functions.

From the foregoing, it can be appreciated that the signalling devices 20 and the system for operating and programming them provide a versatility that heretofore has been unavailable for emergency signalling devices. Virtually any type of individual or group pattern that can be executed by the relative rotation of rotators and lamps can be executed by a light bar incorporating the signalling devices and controlled by the illustrated system. Electromechanically, the versatility of the system is derived from the incremental relative rotation of the reflector 19 and lamp 18 of each of the signalling devices 20 provided by the stepper motor 49. As a complement to the electromechanical features of the signalling devices, the system controlling the devices is microprocessor-based and can be programmed to drive the signalling devices so as to provide virtually any pattern. Furthermore, the overall architecture of the emergency signalling system minimizes the cabling between the control head positioned within the passenger compartment of the vehicle 11 and the light bar 13 mounted on the roof of the vehicle.

What is claimed is:

1. An emergency signalling system for mounting to a vehicle that generates two or more moving beams of light, the system comprising in combination: at least first and second signalling devices for generating the two or more moving beams of light; each signalling device comprising a rotatable reflector driven by a motor; a memory containing data for a plurality of visual patterns, each pattern being made by one of the two or more moving beams of light upon rotation of one of the reflectors; a controller responsive to a user interface for selecting from the memory an appropriate one or more of the plurality of visual patterns and transferring the selected one or more patterns to a variable field of the memory; and a means responsive to the patterns transferred to the variable field of the memory for collectively controlling the motors of the at least first and second signalling devices to generate a desired emergency signal comprising the two or more moving beams of light.

2. The emergency signalling system of claim 1 wherein the motor is a reversible motor.

3. The emergency signalling system of claim 1 wherein the controller includes a first control unit contained in a common housing with the signalling devices and in serial communication with a second control unit contained within the vehicle.

4. The emergency signalling system of claim 1 wherein each of the signalling devices includes a sensor for resolving an orientation of the reflector.

5. An emergency signalling system for a vehicle including: a signalling device mounted to the vehicle for broadcasting emergency signals; a housing for the signalling device; a first control unit within the housing for controlling the signalling device; a second control unit external of the housing and within the vehicle; a cable extending between the first and second control units comprising one or more data-carrying wires for serially communicating information from the first control unit to the second control unit in response to a command generated at a user input connected to the second control unit.

6. The emergency signalling system of claim 5 wherein the first control unit comprises a memory containing a plurality of alternative signalling patterns for the signalling device.

7. The emergency signalling system of claim 5 wherein the signalling device includes a reversible motor.

8. The emergency signalling system of claim 7 wherein the signalling device includes a position sensor for detecting an orientation of a beam generated by the signalling device.

9. The emergency signalling system of claim 8 wherein the first control unit includes a means responsive to a signal from the position sensor.

10. An emergency signalling system for a vehicle comprising in combination: a signalling device for generating a moving beam of light; a base for mating the signalling device with the vehicle; a control unit responsive to a user interface and in communication with the signalling device for changing a visual pattern of the beam of light created by the signalling device; a diagnostic circuit responsive to a sensor for reporting a failure mode of the signalling device.

11. The emergency signalling system as set forth in claim 10 wherein the sensor includes means for detecting the absence of a light beam at the signalling device.

12. The emergency signalling system as set forth in claim 11 wherein the diagnostic circuit includes means for audibly alerting a user of the failure mode.

* * * * *